US007977260B2

(12) United States Patent
Tsukuda et al.

(10) Patent No.: US 7,977,260 B2
(45) Date of Patent: Jul. 12, 2011

(54) SEPARATOR FOR AN ELECTRIC DOUBLE LAYER CAPACITOR

(75) Inventors: Takahiro Tsukuda, Tokyo (JP); Masatoshi Midorikawa, Tokyo (JP); Tomohiro Sato, Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 292 days.

(21) Appl. No.: 12/085,574

(22) PCT Filed: Nov. 28, 2006

(86) PCT No.: PCT/JP2006/323670
§ 371 (c)(1),
(2), (4) Date: May 28, 2008

(87) PCT Pub. No.: WO2007/061108
PCT Pub. Date: May 31, 2007

(65) Prior Publication Data

US 2009/0280308 A1 Nov. 12, 2009

(30) Foreign Application Priority Data

Nov. 28, 2005 (JP) ................................ 2005-341505
Mar. 27, 2006 (JP) ................................ 2006-085445
Mar. 28, 2006 (JP) ................................ 2006-088944

(51) Int. Cl.
*D04H 1/00* (2006.01)
*D04H 13/00* (2006.01)

(52) U.S. Cl. ........ 442/340; 442/341; 442/351; 442/400; 442/401; 442/412; 442/415; 442/416; 428/219; 428/220; 428/338

(58) Field of Classification Search .................. 442/400, 442/401, 412, 415, 416, 340, 341, 351; 428/219, 428/220, 338
See application file for complete search history.

(56) References Cited

U.S. PATENT DOCUMENTS

| | | | | |
|---|---|---|---|---|
| 2003/0180622 | A1 | 9/2003 | Tsukuda et al. | |
| 2007/0247785 | A1 * | 10/2007 | Kobayashi et al. | 361/502 |
| 2007/0287062 | A1 * | 12/2007 | Tsukuda et al. | 429/129 |

FOREIGN PATENT DOCUMENTS

| | | | |
|---|---|---|---|
| JP | 5-267103 | A | 10/1993 |
| JP | 11-168033 | A | 6/1999 |
| JP | 2000-3834 | A | 1/2000 |
| JP | 2000-204174 | A | 7/2000 |
| JP | 2001-244150 | A | 9/2001 |
| JP | 2002-270471 | A | 9/2002 |
| JP | 2003-124065 | A | 4/2003 |
| WO | WO-01/93350 | A1 | 12/2001 |
| WO | WO2005/101432 | A1 * | 10/2005 |

* cited by examiner

*Primary Examiner* — Norca L Torres-Velazquez
(74) *Attorney, Agent, or Firm* — Birch, Stewart, Kolasch & Birch, LLP

(57) ABSTRACT

The present invention provides a separator for an electric double layer capacitor comprising a porous sheet containing fibrillated heat-resistant fibers, polyester fibers having a fineness of 0.01 dtex to less than 0.10 dtex, and fibrillated cellulose, which is suitable for use as a separator for an electric double layer capacitor operating at high voltages of 3 V or more.

36 Claims, No Drawings

SEPARATOR FOR AN ELECTRIC DOUBLE LAYER CAPACITOR

This application is a national stage application filed under 35 U.S.C. §371, based upon International Application No. PCT/JP2006/323670, filed Nov. 28, 2006 and claiming foreign priority based upon Japanese priority documents filed Nov. 28, 2005, the priority of which are claimed herein.

TECHNICAL FIELD

The present invention relates to a separator for an electric double layer capacitor.

BACKGROUND ART

Paper separators consisting mainly of solvent spun cellulose or recycled cellulose fibers have conventionally been used as separators of electric double layer capacitors (see, for example, Patent Documents 1 to 3). Although electrodes composed of activated carbon have conventionally been used for the electrodes of electric double layer capacitors, their energy density and power density were inadequate for applications such as auxiliary power supplies of automobiles and railroad vehicles. Since energy density and power density increase in proportion to the square of the voltage, there has been considerable activity in the improvement of electrode materials. While the upper limit voltage of conventional activated carbon electrodes is about 2.5 to 2.7 V, an electrode operating at an upper limit voltage of about 3.7 to 4.2 V has been developed recently.

When paper separators are exposed to a high voltage of at least 3 V, oxidative deterioration occurs resulting in a considerable decrease in strength possibly leading to tearing of the paper. Thus, paper separators are unsuitable for use as separators of electric double layer capacitors operating at such high voltages. The inventors of the present invention have disclosed a capacitor separator comprising a wet nonwoven fabric which contains fibrillated liquid crystal polymer fibers, non-fibrillated organic fibers having a fineness of 0.5 dtex or less, and non-fibrillated organic fibers having a fineness of 1 to 3.3 dtex (see Patent Document 4). However, further improvement is desired with respect to leakage current, internal resistance, capacitance fluctuations, capacitance retention rate and vibration resistance. A separator for an electric double layer capacitor has been disclosed that is comprised of a fiber sheet containing fibrillated organic fibers and narrow polyester fibers having a fineness of 0.45 dtex or less (see Patent Document 5). However, this separator had problems with internal resistance, leakage current, capacitance retention rate and vibration resistance. Here, vibration resistance refers to a property required in the case that separators are mounted in an automobile or railroad vehicle. Separators are required that are not damaged or do not allow the formation of holes due to vibrations generated during idling or moving of automobiles or railroad vehicles.

[Patent Document 1] Japanese Unexamined Patent Publication No. H5-267103

[Patent Document 2] Japanese Unexamined Patent Publication No. H11-168033

[Patent Document 3] Japanese Unexamined Patent Publication No. 2000-3834

[Patent Document 4] Japanese Unexamined Patent Publication No. 2003-124065

[Patent Document 5] Japanese Unexamined Patent Publication No. 2001-244150

DISCLOSURE OF THE INVENTION

Problems to be Solved by the Invention

In view of the foregoing, the present invention relates to a separator for an electric double layer capacitor that is suitable for an electric double layer capacitor operating at high voltages of 3 V or more.

Means to Solve the Problems

As a result of conducting extensive studies to solve the aforementioned problems, the present inventors found that use of a combination of specific fibers enables a separator for an electric double layer capacitor that is suitable for electric double layer capacitors operating at high voltages of 3 V or more to be realized, thereby leading to completion of the present invention.

Namely, a first aspect of the present invention is a separator for an electric double layer capacitor comprising a porous sheet containing fibrillated heat-resistant fibers, polyester fibers having a fineness of 0.01 dtex to less than 0.10 dtex, and fibrillated cellulose.

In the separator for an electric double layer capacitor of the first aspect of the present invention, the weight ratio of the fibrillated heat-resistant fibers to the total amount of polyester fibers is preferably 1:17 to 90:1, and the weight ratio of the fibrillated heat-resistant fibers to the fibrillated cellulose is preferably 1:10 to 20:1.

A second aspect of the present invention is a separator for an electric double layer capacitor comprising a porous sheet containing fibrillated heat-resistant fibers, polyester fibers having a fineness of 0.01 dtex to less than 0.10 dtex, polyester fibers having a fineness of greater than 0.45 dtex to less than 1.00 dtex, and fibrillated cellulose.

In the separator for an electric double layer capacitor of the second aspect of the present invention, the weight ratio of the fibrillated heat-resistant fibers to the total amount of polyester fibers is preferably 1:17 to 44:1, the weight ratio of the fibrillated heat-resistant fibers to the fibrillated cellulose is preferably 1:10 to 20:1, and the weight ratio of the polyester fibers having a fineness of 0.01 dtex to less than 0.10 dtex to the polyester fibers having a fineness of greater than 0.45 dtex to less than 1.00 dtex is preferably 1:50 to 79:1.

A third aspect of the present invention is a separator for an electric double layer capacitor comprising a porous sheet containing fibrillated heat-resistant fibers, polyester fibers having a fineness of 0.01 dtex to less than 0.10 dtex, polyester fibers having a fineness of 0.10 to 0.45 dtex, and fibrillated cellulose.

In the separator for an electric double layer capacitor of the third aspect of the present invention, the weight ratio of the fibrillated heat-resistant fibers to the total amount of polyester fibers is preferably 1:17 to 44:1, the weight ratio of the fibrillated heat-resistant fibers to the fibrillated cellulose is preferably 1:10 to 20:1, and the weight ratio of the polyester fibers having a fineness of 0.01 dtex to less than 0.10 dtex to the polyester fibers having a fineness of 0.10 to 0.45 dtex is preferably 1:79 to 79:1.

A fourth aspect of the present invention is a separator for an electric double layer capacitor comprising a porous sheet containing fibrillated heat-resistant fibers, polyester fibers having a fineness of 0.01 dtex to less than 0.10 dtex, polyester fibers having a fineness of 0.10 to 0.45 dtex, polyester fibers having a fineness of greater than 0.45 dtex to less than 1.00 dtex, and fibrillated cellulose.

In the separator for an electric double layer capacitor of the fourth aspect of the present invention, the weight ratio of the fibrillated heat-resistant fibers to the total amount of polyester fibers is preferably 1:17 to 44:1, the weight ratio of the fibrillated heat-resistant fibers to the fibrillated cellulose is preferably 1:10 to 20:1, and the weight ratio of the total amount of the polyester fibers having a fineness of 0.01 dtex to less than 0.10 dtex and the polyester fibers having a fineness of greater than 0.45 dtex to less than 1.00 dtex to the polyester fibers having a fineness of 0.10 to 0.45 dtex is preferably 1:40 to 79:1.

In the present invention, the fibrillated heat-resistant fibers and the fibrillated cellulose preferably have a Canadian standard freeness of 0 to 500 ml and a weight average fiber length of 0.1 to 2 mm.

In the present invention, the fibrillated heat-resistant fibers are preferably para-aramid fibers.

In the present invention, the polyester fibers are preferably polyethylene terephthalate fibers.

The separator for an electric double layer capacitor of the present invention preferably has a thickness of 10 to 80 μm and a density of 0.25 to 0.65 $g/cm^3$.

In the present invention, the separator preferably has a static friction coefficient of 0.40 to 0.65, when measured in accordance with the inclined method of JIS P8147 using a 100 g weight consisting of a rectangular solid having a vertical and horizontal length of 25 mm and a height of 20 mm.

In the present invention, the separator for an electric double layer capacitor preferably has a puncture strength of 1.40 N or more when impregnated with an electrolyte.

Effects of the Invention

According to the present invention, by use of combination of fibrillated heat-resistant fibers, polyester fibers having a fineness of 0.01 dtex to less than 0.10 dtex and fibrillated cellulose, a separator for an electric double layer capacitor having a smaller leakage current can be obtained. According to the present invention, use of combination of fibrillated heat-resistant fibers, polyester fibers having a fineness of 0.01 dtex to less than 0.10 dtex, polyester fibers having a fineness of greater than 0.45 dtex to less than 1.00 dtex, and fibrillated cellulose, enables the separator for an electric double layer capacitor not only to have lower internal resistance but also to have increased puncture strength when impregnated with an electrolyte, and thus a separator for an electric double layer capacitor is obtained having satisfactory vibration resistance important in the case of being mounted in an automobile or railroad vehicle. According to the present invention, use of combination of fibrillated heat-resistant fibers, polyester fibers having a fineness of 0.01 dtex to less than 0.10 dtex, polyester fibers having a fineness of 0.10 to 0.45 dtex and fibrillated cellulose, enables the separator to have increased electrolyte retention ability resulting in decreased susceptibility to drying up, and thus a separator for an electric double layer capacitor is obtained having a higher capacitance retention rate. According to the present invention, use of combination of fibrillated heat-resistant fibers, polyester fibers having a fineness of 0.01 dtex to less than 0.10 dtex, polyester fibers having a fineness of 0.10 dtex to 0.45 dtex, polyester fibers having a fineness of greater than 0.45 dtex to less than 1.00 dtex, and fibrillated cellulose, enables the separator not only to have reduced capacitance fluctuations, thereby allowing the obtaining of a separator for an electric double layer having higher reliability, but also to have increased puncture strength when impregnated with an electrolyte, thereby allowing the obtaining of a separator for an electric double layer capacitor having satisfactory vibration resistance important in the case of being mounted in an automobile or railroad vehicle. Thus, according to the present invention, a separator for an electric double layer capacitor is obtained that is particularly suitable for an electric double layer capacitor operating at high voltages of 3 V or more. Furthermore, in the present invention, "fineness" refers to the number of grams per 10000 m of fiber.

BEST MODE FOR CARRYING OUT THE INVENTION

An electric double layer capacitor in the present invention refers to that having an electric storage mechanism composed in the form where an electric double layer is interposed between two opposing electrodes. The electrodes of the electric double layer capacitor may be a pair of electric double layer electrodes or a combination in which one electrode is an electric double layer electrode and the other is an oxidation-reduction electrode. An example of an electric double layer electrode may also include an electrode comprised of a carbon material such as activated carbon or non-porous carbon. Here, non-porous carbon refers to carbon including graphite-like microcrystalline carbon, which is produced by a different process from that for activated carbon. Ions enter and leave micropores of activated carbon accompanying charging and discharging in the case of activated carbon, while ions enter and leave between layers of microcrystalline carbon in the case of non-porous carbon. An example of an electric double layer electrode may include that in which the above-mentioned carbon materials are doped with lithium ions. The pair of electric double layer electrodes may respectively be the same or different. Examples of oxidation-reduction electrodes may include, but are not limited to, electrically conductive polymers such as polypyrroles, polythiophenes, polyanilines, polyacetylene, polyacenes, indole trimers, polyphenylquinoxalines or derivatives thereof, and metal oxides such as ruthenium oxide, indium oxide or tungsten oxide.

Examples of the electrolyte of an electric double layer capacitor may include, but are not limited to, aqueous solutions in which ionizable salts are dissolved; solutions in which ionizable salts are dissolved in an organic solvent such as propylene carbonate (PC), ethylene carbonate (EC), dimethyl carbonate (DMC), diethyl carbonate (DEC), acetonitrile (AN), propionitrile, γ-butyrolactone (BL), dimethylformamide (DMF), tetrahydrofuran (THF), dimethoxyethane (DME), dimethoxymethane (DMM), sulfolan (SL), dimethylsulfoxide (DMSO), ethylene glycol, propylene glycol or methyl cellosolve; and ionic liquids (molten salts). For an electric double layer capacitor able to employ either an aqueous solution system or organic solvent system, an organic solvent system is preferably employed since aqueous solution systems have a lower withstand voltage. An electrically conductive polymer film, such as polypyrroles, polythiophenes, polyanilines, polyacetylenes, polyacenes and derivatives thereof, may also be used in an electric double layer capacitor instead of an electrolyte.

Heat-resistant fibers in the present invention refer to fibers having a softening point, melting point and thermal decomposition temperature all within the range of 250 to 700° C. Specific examples of the heat-resistant fibers may include para-aramid, meta-aramid, wholly aromatic polyester, wholly aromatic polyester amide, wholly aromatic polyether, wholly aromatic polycarbonate, wholly aromatic polyazomethines, polyphenylene sulfide (PPS), poly(paraphenylenebenzobisthiazole) (PBZT), polybenzoimidazole (PBI), polyether ether ketone (PEEK), polyamide-imide (PAI), polyimide, polytetrafluoroethylene (PTFE) and poly(paraphenylene-2,6-benzobisoxazole) (PBO) fibers, and these may be used alone or in a combination of two or more types thereof. PBZT may be in the trans form or cis form. Here, the "fibers having a softening point, melting point and thermal decomposition temperature all within the range of 250 to 700° C." may include fibers having thermal decomposition temperature within the range of 250 to 700° C. while having unclear softening point and melting point. Aramid and PBO fibers are examples thereof. Among these fibers, aramid fibers, and particularly para-aramid fibers, are preferable since they are easily uniformly and narrowly fibrillated due to their liquid crystallinity. Aramid refers to wholly aromatic polyamide in which at least 85 mol % of the amide bonds are attached directly to two aromatic rings.

The heat-resistant fibers used in the present invention preferably have a softening point, melting point and thermal decomposition temperature of 250 to 700° C., more preferably 260 to 650° C., even more preferably 270 to 600° C. and most preferably 280 to 550° C.

Para-aramid in the present invention refers to a polymer obtained by polycondensation of a para-oriented aromatic diamine and a para-oriented aromatic dicarboxylic acid halide, or a polymer obtained by polycondensation of a para-oriented aromatic diamine, a para-oriented aromatic dicarboxylic acid halide, and other monomers such as a meta-oriented aromatic diamine, meta-oriented aromatic dihalide, aliphatic diamine and aliphatic dicarboxylic acid, wherein a copolymerization ratio of the other monomers is 40 mol % or less based on the aforementioned para-oriented monomers; wherein the polymers are composed of repeating units in which amide bonds are attached to the aromatic ring at the para position or at a direction pursuant thereto. In addition, a portion of the hydrogen atoms of the aromatic ring of the para-oriented aromatic diamine or para-oriented aromatic dicarboxylic acid halide may be substituted with substituents that do not form amide bonds, and the aromatic ring may be consist of multiple rings. Examples of substituents that do not form amide bonds may include alkyl groups, alkoxy groups, halogen atoms, sulfonyl groups, nitro groups, phenyl groups and others. Since alkyl groups and alkoxy groups easily inhibit polycondensation if these groups have a large number of carbon atoms, these groups have preferably 1 to 4 carbon atoms. Examples of para-oriented aromatic diamines in which a portion of the hydrogen atoms of the aromatic ring is/are substituted with an alkyl group(s) may include, but are not limited to, N,N'-dimethyl paraphenylenediamine, N,N'-diethyl paraphenylenediamine, 2-methyl-4-ethyl paraphenylenediamine, and 2-methyl-4-ethyl-5-propyl paraphenylenediamine. Examples of para-oriented aromatic carboxylic acid halides in which a portion of the hydrogen atoms of the aromatic ring is/are substituted with an alkoxy group(s) may include, but are not limited to, dimethoxyterephthalic acid chloride, diethoxyterephthalic acid chloride and 2-methoxy-4-ethoxyterephthalic acid chloride. Examples of para-oriented aromatic diamines in which the aromatic ring consists of multiple rings may include, but are not limited to, 4,4'-oxydiphenyldiamine, 4,4'-sulfonyldiphenyldiamine, 4,4'-diphenyldiamine, 3,3'-oxydiphenyldiamine, 3,3'-sulfonyldiphenyldiamine and 3,3'-diphenyldiamine. Moreover, in the case of the aromatic ring consisting of multiple rings as well, a portion of the hydrogen atoms of these aromatic rings may be substituted with substituents that do not form amide bonds as previously described. Examples of para-oriented aromatic dicarboxylic acid halides in which the aromatic ring consists of multiple rings may include, but are not limited to, 4,4'-oxydibenzoyl chloride, 4,4'-sulfonyldibenzoyl chloride, 4,4'-dibenzoyl chloride, 3,3'-oxydibenzoyl chloride, 3,3'-sulfonyldibenzoyl chloride and 3,3'-dibenzoyl chloride. Moreover, even in the case of the aromatic ring consisting of multiple rings, a portion of the hydrogen atoms of these aromatic rings may be substituted with substituents that do not form amide bonds as previously described.

Specific examples of para-oriented aramids in the present invention may include, but are not limited to, poly(paraphenyleneterephthalamide), poly(para-benzamide), poly(para-amidohydrazide), poly(para-phenyleneterephthalamido-3,4-diphenyl ether terephthalamide), poly(4,4'-benzanilidoterephthalamide), poly(para-phenylene-4,4'-biphenylene dicarboxylic acid amide), poly(para-phenylene-2,6-naphthalene dicarboxylic acid amide), poly(2-chloro-p-phenyleneterephthalamide) and copolyparaphenylene-3,4'-oxydiphenyleneterephthalamide. Among these polymers, poly(para-phenyleneterephthalamide) is particularly preferable due to its superior heat resistance.

Fibrils in the present invention, in the case of both the heat-resistant fibers and cellulose, refer to fibers not in the form of a film but rather a fibrous form having a portion that is extremely finely divided primarily in a direction parallel to the fiber axis, wherein at least a portion of the fibers have a fiber diameter of 1 μm or less. The aspect ratio of the length to width is preferably distributed within the range of about 20 to about 100000. The Canadian standard freeness is preferably within the range of 0 to 500 ml, and more preferably within the range of 0 to 200 ml. Moreover, the weight average fiber length is preferably within the range of 0.1 to 2 mm.

Fibrillation in the present invention, in the case of both the heat-resistant fibers and cellulose, can be carried out using a refiner, beater, mill, grinding apparatus, rotary blade homogenizer that imparts shearing force with high-speed rotary blades, double cylinder-type high-speed homogenizer that generates shearing force between cylindrical inner blades rotating at a high speed and stationary outer blades, ultrasonic crusher for crushing with collisions generated by ultrasonic waves, or high-pressure homogenizer applying shearing force and cutting force to fibers by accelerating a fiber suspension by passing through a small diameter orifice while imparting a pressure difference of at least 3000 psi followed by rapidly decelerating by causing collisions between the fibers. Treating with a high-pressure homogenizer is particularly preferable since it allows the obtaining of narrow fibrils.

Examples of fibrillated cellulose in the present invention may include fibrillated solvent spun cellulose, fibrillated wood fiber and wood pulp, fibrillated non-wood fibers and non-wood pulp such as linter, lint, hemp or parenchyma cell fiber, and bacterial cellulose. Parenchyma cell fiber refers to fibers that are insoluble in water, consisting mainly of cellulose obtained by treatments such as alkaline treatment of plant tissues consisting mainly of parenchyma cells present in the stem, leaves, root or fruit. Among them, fibrillated cellulose obtained by fibrillating linter, wood pulp, hemp or parenchyma cell fiber is preferable due to ease of obtaining narrow fibrils. In particular, linter, wood pulp and parenchyma cell fiber are even more preferable due to the ease of obtaining extremely fine fibrils.

Examples of polyester fibers used in the present invention may include fibers composed of polyethylene terephthalate, polybutylene terephthalate, polytrimethylene terephthalate, polyethylene naphthalate, polybutylene naphthalate and derivatives thereof. Among these, polyethylene terephthalate fibers are preferable. The polyester fibers of the present invention may consist of a single resin component, or may also be composite fibers composed of two or more types of resin components. The composite fibers may be of any type, such as a core-sheath type, side-by-side type or alternating layer type. Both polyester fibers composed of a single component and composite polyester fibers may be so-called heat-fusible fibers having heat-fusible properties.

The separator for an electric double layer capacitor of the first aspect of the present invention contains fibrillated heat-resistant fibers, polyester fibers having a fineness of 0.01 dtex to less than 0.10 dtex and fibrillated cellulose, thereby reducing leakage current. If the fineness of the polyester fibers is less than 0.01 dtex, the firmness and strength of the separator for an electric double layer capacitor may be weakened, thereby resulting in decreased handling.

In the separator for an electric double layer capacitor of the first aspect of the present invention, the weight ratio of the fibrillated heat-resistant fibers to the total amount of polyester fibers is preferably 1:17 to 90:1, and the weight ratio of the fibrillated heat-resistant fibers to the fibrillated cellulose is preferably 1:10 to 20:1. More preferably, the weight ratio of the fibrillated heat-resistant fibers to the total amount of polyester fibers is 1:13 to 40:1, and the weight ratio of the fibrillated heat-resistant fibers to the fibrillated cellulose is 1:7 to 15:1. In the weight ratio of the fibrillated heat-resistant fibers to the total amount of polyester fibers, if the weight ratio of the fibrillated heat-resistant fibers is less than 1:17, pinholes may be formed, while if the weight ratio exceeds 90:1, the fibrillated heat-resistant fibers may easily come out of the separator for an electric double layer capacitor, or processabilities such as cutability may become poor. In the weight ratio of the fibrillated heat-resistant fibers to the fibrillated cellulose, if the weight ratio of the fibrillated heat-resistant fibers is less than 1:10, the oxidation resistance of the separator for an electric double layer capacitor may become inadequate, while if the weight ratio exceeds 20:1, fuzzing may occur or leakage current may increase.

The separator for an electric double layer capacitor of the second aspect of the present invention contains fibrillated heat-resistant fibers, polyester fibers having a fineness of 0.01 dtex to less than 0.10 dtex, polyester fibers having a fineness of greater than 0.45 dtex to less than 1.00 dtex, and fibrillated cellulose. Such a constitution enables the separator not only to have lower internal resistance but also to have increased puncture strength when impregnated with an electrolyte, and thus a separator for an electric double layer capacitor is obtained having increased vibration resistance important in the case of being mounted in an automobile or railroad vehicle.

In the separator for an electric double layer capacitor of the second aspect of the present invention, the weight ratio of the fibrillated heat-resistant fibers to the total amount of polyester fibers is preferably 1:17 to 44:1, the weight ratio of the fibrillated heat-resistant fibers to the fibrillated cellulose is preferably 1:10 to 20:1, and the weight ratio of the polyester fibers having a fineness of 0.01 dtex to less than 0.10 dtex to the polyester fibers having a fineness of greater than 0.45 dtex to less than 1.00 dtex is preferably 1:50 to 79:1. More preferably, the weight ratio of the fibrillated heat-resistant fibers to the total amount of polyester fibers is 1:13 to 25:1, the weight ratio of the fibrillated heat-resistant fibers to the fibrillated cellulose is 1:7 to 15:1, and the weight ratio of the polyester fibers having a fineness of 0.01 dtex to less than 0.10 dtex to the polyester fibers having a fineness of greater than 0.45 dtex to less than 1.00 dtex is 1:20 to 40:1. In the weight ratio of the fibrillated heat-resistant fibers to the total amount of polyester fibers, if the weight ratio of the fibrillated heat-resistant fibers is less than 1:17, pinholes may be formed, while if the weight ratio exceeds 44:1, the fibrillated heat-resistant fibers may easily come out of the separator for an electric double layer capacitor or processabilities such as cutability may become poor. In the weight ratio of the fibrillated heat-resistant fibers to the fibrillated cellulose, if the weight ratio of the fibrillated heat-resistant fibers is less than 1:10, the oxidation resistance of the separator for an electric double layer capacitor may become inadequate, while if the weight ratio exceeds 20:1, fuzzing may occur or leakage current may increase. In the weight ratio of the polyester fibers having a fineness of 0.01 dtex to less than 0.10 dtex to the polyester fibers having a fineness of greater than 0.45 dtex to less than 1.00 dtex, if the weight ratio of polyester fibers having a fineness of 0.01 dtex to less than 0.10 dtex is less than 1:50, capacitance fluctuations may become large, while if the weight ratio exceeds 79:1, the capacitance retention rate may become inadequate.

The separator for an electric double layer capacitor of the third aspect of the present invention contains fibrillated heat-resistant fibers, polyester fibers having a fineness of 0.01 dtex to less than 0.10 dtex, polyester fibers having a fineness of 0.10 dtex to 0.45 dtex, and fibrillated cellulose. Such a constitution enables the separator to have increased electrolyte retention ability resulting in decreased susceptibility to drying up, and thus a separator for an electric double layer capacitor is obtained having a higher capacitance retention rate.

In the separator for an electric double layer capacitor of the third aspect of the present invention, the weight ratio of the fibrillated heat-resistant fibers to the total amount of polyester fibers is preferably 1:17 to 44:1, the weight ratio of the fibrillated heat-resistant fibers to the fibrillated cellulose is preferably 1:10 to 20:1, and the weight ratio of the polyester fibers having a fineness of 0.01 dtex to less than 0.10 dtex to the polyester fibers having a fineness of 0.10 to 0.45 dtex is preferably 1:79 to 79:1. More preferably, the weight ratio of the fibrillated heat-resistant fibers to the total amount of polyester fibers is 1:13 to 25:1, the weight ratio of the fibrillated heat-resistant fibers to the fibrillated cellulose is 1:7 to 15:1, and the weight ratio of the polyester fibers having a fineness of 0.01 dtex to less than 0.10 dtex to the polyester fibers having a fineness of 0.10 to 0.45 dtex is 1:40 to 40:1. In the weight ratio of the fibrillated heat-resistant fibers to the total amount of polyester fibers, If the weight ratio of the fibrillated heat-resistant fibers is less than 1:17, pinholes may be formed, while if the weight ratio exceeds 44:1, the fibrillated heat-resistant fibers may easily come out of the separator for an electric double layer capacitor or processabilities such as cutability may become poor. In the weight ratio of the fibrillated heat-resistant fibers to the fibrillated cellulose, if the weight ratio of the fibrillated heat-resistant fibers is less than 1:10, the oxidation resistance of the separator for an electric double layer capacitor may become inadequate, while if the weight ratio exceeds 20:1, fuzzing may occur or leakage current may increase. In the weight ratio of the polyester fibers having a fineness of 0.01 dtex to less than 0.10 dtex to the polyester fibers having a fineness of 0.10 to 0.45 dtex, if the weight ratio of polyester fibers having a fineness of 0.01 dtex to less than 0.10 dtex is less than 1:79, capacitance fluctuations may become large, while if the weight ratio exceeds 79:1, the capacitance retention rate may become inadequate.

The separator for an electric double layer capacitor of the fourth aspect of the present invention contains fibrillated heat-resistant fibers, polyester fibers having a fineness of 0.01 dtex to less than 0.10 dtex, polyester fibers having a fineness of 0.10 to 0.45 dtex, polyester fibers having a fineness of greater than 0.45 dtex to less than 1.00 dtex, and fibrillated cellulose. Such a constitution enables the separator to have reduced capacitance fluctuations, thereby allowing the obtaining of a separator for an electric double layer having higher reliability. Furthermore, such a constitution enables the separator to have increased puncture strength when impregnated with an electrolyte, thereby allowing the obtaining of a separator for an electric double layer capacitor having satisfactory vibration resistance important in the case of being mounted in an automobile or railroad vehicle.

In the separator for an electric double layer capacitor of the fourth aspect of the present invention, the weight ratio of the fibrillated heat-resistant fibers to the total amount of polyester fibers is preferably 1:17 to 44:1, the weight ratio of the fibrillated heat-resistant fibers to the fibrillated cellulose is preferably 1:10 to 20:1, and the weight ratio of the total amount of the polyester fibers having a fineness of 0.01 dtex to less than 0.10 dtex and the polyester fibers having a fineness of greater than 0.45 dtex to less than 1.00 dtex to the polyester fibers having a fineness of 0.10 to 0.45 dtex is preferably 1:40 to 79:1. More preferably, the weight ratio of the fibrillated heat-resistant fibers to the total amount of polyester fibers is 1:13 to 25:1, the weight ratio of the fibrillated heat-resistant fibers to the fibrillated cellulose is 1:7 to 15:1, and the weight ratio of the total amount of the polyester fibers having a fineness of 0.01 dtex to less than 0.10 dtex and the polyester fibers having a fineness of greater than 0.45 dtex to less than 1.00 dtex to the polyester fibers having a fineness of 0.10 to 0.45 dtex is 1:20 to 40:1. In the weight ratio of the fibrillated heat-resistant fibers to the total amount of polyester fibers, if the weight ratio of the fibrillated heat-resistant fibers is less than 1:17, pinholes may be formed, while if the weight ratio exceeds 44:1, the fibrillated heat-resistant fibers may easily come out of the separator for an electric double layer capacitor or processabilities such as cutability may become poor. In the weight ratio of the fibrillated heat-resistant fibers to the fibrillated cellulose, if the weight ratio of the fibrillated heat-resistant fibers is less than 1:10, the oxidation resistance of the separator for an electric double layer capacitor may become inadequate, while if the weight ratio exceeds 20:1, fuzzing may occur or leakage current may increase. In the weight ratio of the total amount of the polyester fibers having a fineness of 0.01 dtex to less than 0.10 dtex and the polyester fibers having a fineness greater than 0.45 dtex to less than 1.00 dtex to the polyester fibers having a fineness of 0.10 to 0.45 dtex, if the weight ratio of the total amount of the polyester fibers having a fineness of 0.01 dtex to less than 0.10 dtex and the polyester fibers having a fineness of greater than 0.45 dtex to less than 1.00 dtex is less than 1:40, the capacitance retention rate may become inadequate, while if the weight ratio exceeds 79:1, capacitance fluctuations may become large.

The separator for an electric double layer capacitor of the present invention preferably has a static friction coefficient of 0.40 to 0.65, when measured in accordance with the inclined method of JIS P8147 using a 100 g weight consisting of a rectangular solid having a vertical and horizontal length of 25 mm and height of 20 mm. More specifically, a separator sample (referred to as a main unit separator sample) is affixed to a smooth aluminum plate, and this aluminum plate is attached to an inclined plate of a sliding inclination angle measuring device with the separator sample side facing upward. At the same time, a separator sample (referred to as a weight separator sample) identical to the main unit separator sample is attached to a weight. The angle of the inclined plate is set to zero and the weight separator sample is placed on the main unit separator sample side on the inclined plate with the weight separator sample side facing downward. The angle of the inclined plate is then increased at the rate of 3 degrees or less per second, and the inclination angle θ when the weight begins to slide is read from the measuring device. The tangent tan θ when the weight begins to slide is determined as the static friction coefficient.

In the present invention, when the static friction coefficient is measured for both faces of the separator sample (between front face and front face, and between back face and back face), the mean thereof is preferably 0.40 to 0.65. If the static friction coefficient is less than 0.40, there may be a likelihood of the electrolyte drying out or bleeding-out, resulting in cases in which the capacitance retention rate may be inadequate. On the other hand, if the static friction coefficient exceeds 0.65, leakage current may become somewhat large as well as the assembly workability of the electric double layer capacitor may decrease.

A preferable range for the static friction coefficient of the separator for an electric double layer capacitor of the present invention, namely the range of 0.40 to 0.65, can be achieved by adjusting the density and thickness of the separator for an electric double layer capacitor, the content of the fibrillated heat-resistant fibers and the content of the polyester fibers. For example, the static friction coefficient tends to increase the higher the content of the fibrillated heat-resistant fibers, while the static friction coefficient tends to decrease the greater the density and the lower the thickness.

The polyester fibers used in the present invention can be produced by such methods as solvent spinning, electro-spinning or melt blowing, and solvent spinning is preferable since it facilitates a relative increase in monofilament strength. In the present invention, the fiber length of the polyester fibers is preferably 1 to 15 mm and more preferably 2 to 6 mm. If the fiber length is less than 1 mm, the fibers may come out of the separator for an electric double layer capacitor, while if the fiber length exceeds 15 mm, the fibers may tend to easily become unraveled and ball up thereby resulting in uneven thickness.

The porous sheet in the present invention can be produced by a papermaking method using, for example, a cylinder papermaking machine, Fourdrinier papermaking machine, short-wire papermaking machine, inclined papermaking machine or combination papermaking machine consisting of a combination of similar or different types of these papermaking machines. A dispersant, thickener, inorganic filler, organic filler or antifoaming agent and the like can be suitably added to the raw material slurry in addition to the fiber raw materials if desired. The raw material slurry is adjusted to have a solid concentration of about 5% by weight to 0.001% by weight using water and preferably distilled water or ion exchange water. This raw material slurry is further diluted to a prescribed concentration prior to papermaking. The porous sheet obtained by papermaking is subjected to treatment such as calendaring treatment, hot calendaring treatment or heat treatment if desired.

There are no particular limitations on the thickness of the separator for an electric double layer capacitor of the present invention, and the separator preferably has a thickness of 10 to 80 μm and more preferably 30 to 60 μm. If the thickness is less than 10 μm, the separator may be susceptible to tearing or the formation of holes during handling and processing. If the thickness exceeds 80 μm, the area for an electrode housed in an electric double layer capacitor decreases, resulting in cases in which the capacitance of the electric double layer capacitor may decrease.

There are no particular limitations on the density of the separator for an electric double layer capacitor of the present invention, and the separator preferably has a density of 0.25 to 0.65 $g/cm^3$ and more preferably 0.45 to 0.65 $g/cm^3$. If the density is less than 0.25 g/cm$^3$, leakage current may increase, while if the density exceeds 0.65 g/cm$^3$, internal resistance may increase.

The separator for an electric double layer capacitor of the present invention preferably has a puncture strength of 1.40 N or more when impregnated with an electrolyte. If the separator has a puncture strength of less than 1.40 N when impregnated with an electrolyte, the vibration resistance of the separator for an electric double layer capacitor may be inadequate. Here, puncture strength when impregnated with an electrolyte refers to puncture strength of the separator in the state of being impregnated with an electrolyte. In the present invention, puncture strength refers to the maximum load (N) when a metal needle having a rounded tip and a diameter of 1 mm is moved vertically downward to the surface of a separator sample at a constant speed, and that needle passes through the sample. The curvature of the rounded tip of the needle is preferably 1 to 2. A commercially available tensile tester or desktop material tester is used for the puncture strength measuring device.

EXAMPLES

The following provides a more detailed explanation of the present invention through examples thereof, but the present invention is not limited to the examples.

<Fibrillated Heat-Resistant Fibers 1>

Para-aramid fibers (Teijin Techno Products, Ltd., trade name: Twaron 1080, fineness: 1.2 dtex) were dispersed in ion exchange water to an initial density of 5% by weight followed by repeatedly subjecting to 15 rounds of beating treatment using a double disk refiner to produce fibrillated para-aramid fibers having a weight average fiber length of 1.55 mm and Canadian standard freeness of 100 ml. These fibers are hereinafter designated as Fibrillated Heat-Resistant Fibers 1 or FB1.

<Fibrillated Heat-Resistant Fibers 2>

The fibrillated heat-resistant fibers 1 were repeatedly subjected to 25 rounds of beating treatment using a high-pressure homogenizer under conditions of 50 MPa to produce fibrillated para-aramid fibers having a weight average fiber length of 0.61 mm and Canadian standard freeness of 0 ml. These fibers are hereinafter designated as Fibrillated Heat-Resistant Fibers 2 or FB2.

<Polyester Fibers 1 to 7>

The polyester fibers 1 to 7 shown in Table 1 were used. Polyethylene terephthalate resin was subjected to melt spinning followed by drawing to produce tows each having a prescribed fineness, followed by cutting to a prescribed length to produce the polyester fibers 1 to 7. These polyester fibers are hereinafter designated as Polyester Fibers 1 to 7 or PETs 1 to 7.

TABLE 1

| Polyester fiber | Fineness (dtex) | Fiber length (mm) |
|---|---|---|
| PET1 | 0.01 | 2 |
| PET2 | 0.06 | 3 |
| PET3 | 0.09 | 3 |
| PET4 | 0.10 | 3 |
| PET5 | 0.45 | 3 |
| PET6 | 0.60 | 5 |
| PET7 | 0.90 | 5 |

<Polyester Fibers 8>

Commercially-available core-sheath polyester fibers having a fineness of 1.10 dtex and fiber length of 5 mm (core: polyethylene terephthalate, sheath: copolymer polyester having a polyethylene terephthalate component and polyethylene isophthalate component, Teijin Fibers Ltd., trade name: TJ04CN) are designated as Polyester Fibers 8 or PET8.

<Fibrillated Cellulose 1>

Cotton linter was dispersed in ion exchange water to an initial concentration of 5% by weight followed by repeatedly subjecting to 20 rounds of treatment using a high-pressure homogenizer at a pressure of 50 MPa to produce fibrillated cellulose having a weight average fiber length of 0.33 mm and Canadian standard freeness of 0 ml. This fibrillated cellulose is hereinafter designated as Fibrillated Cellulose 1 or FBC1.

<Fibrillated Cellulose 2>

Solvent-spun cellulose having a fineness of 1.7 dtex and fiber length of 5 mm (Lenzing, trade name: Tencel) was dispersed in ion exchange water to an initial concentration of 5% by weight followed by repeatedly subjecting to 20 rounds of beating treatment using a double disk refiner to produce fibrillated cellulose having a weight average fiber length of 0.64 mm and Canadian standard freeness of 10 ml. This fibrillated cellulose is hereinafter designated as Fibrillated Cellulose 2 or FBC2.

Papermaking slurries were prepared according to the fiber groups and blending ratios shown in Tables 2 to 5. More specific blends are shown in Tables 6 to 10. In Tables 2 to 10, "FB" refers to fibrillated heat-resistant fibers, "A" refers to polyester fibers having a fineness of 0.01 dtex to less than 0.10 dtex, "B" refers to polyester fibers having a fineness of 0.10 to 0.45 dtex, "C" refers to polyester fibers having a fineness of greater than 0.45 dtex to less than 1.00 dtex, "D" refers to polyester fibers having a fineness of 1.00 dtex or more, and "FBC" refers to fibrillated cellulose. Furthermore, the blending ratios in FB, A, B, C, D and FBC are respectively indicated in percent by weight.

TABLE 2

| Example | Slurry | FB | A | B | C | FBC | FB:(A + B + C) weight ratio | FB:FBC weight ratio |
|---|---|---|---|---|---|---|---|---|
| 1 | 1 | 4 | 72 | 0 | 0 | 24 | 1:18 | 1:6 |
| 2 | 2 | 91 | 1 | 0 | 0 | 8 | 91:1 | 91:8 |
| 3 | 3 | 90 | 1 | 0 | 0 | 9 | 90:1 | 10:1 |
| 4 | 4 | 4 | 56 | 0 | 0 | 40 | 1:14 | 1:10 |
| 5 | 5 | 80 | 16 | 0 | 0 | 4 | 5:1 | 20:1 |
| 6 | 6 | 4 | 68 | 0 | 0 | 28 | 1:17 | 1:7 |
| 7 | 7 | 80 | 2 | 0 | 0 | 18 | 40:1 | 40:9 |
| 8 | 8 | 75 | 20 | 0 | 0 | 5 | 15:4 | 15:1 |
| 9 | 9 | 10 | 60 | 0 | 0 | 30 | 1:6 | 1:3 |
| 10 | 10 | 4 | 52 | 0 | 0 | 44 | 1:13 | 1:11 |
| 11 | 11 | 88 | 8 | 0 | 0 | 4 | 11:1 | 22:1 |
| 12 | 12 | 60 | 25 | 0 | 0 | 15 | 12:5 | 4:1 |
| 13 | 13 | 75 | 5 | 0 | 0 | 20 | 15:1 | 15:4 |
| 14 | 14 | 30 | 60 | 0 | 0 | 10 | 1:2 | 3:1 |
| 15 | 15 | 10 | 50 | 0 | 0 | 40 | 1:5 | 1:4 |
| 16 | 16 | 85 | 5 | 0 | 0 | 10 | 17:1 | 17:2 |
| 17 | 17 | 20 | 65 | 0 | 0 | 15 | 4:13 | 4:3 |
| 18 | 18 | 80 | 10 | 0 | 0 | 10 | 8:1 | 8:1 |

TABLE 3

| Example | Slurry | FB | A | B | C | FBC | FB:(A + B + C) weight ratio | FB:FBC weight ratio | A:C weight ratio |
|---|---|---|---|---|---|---|---|---|---|
| 19 | 19 | 4 | 71 | 0 | 1 | 24 | 1:18 | 1:6 | 71:1 |
| 20 | 20 | 90 | 1 | 0 | 1 | 8 | 45:1 | 45:4 | 1:1 |
| 21 | 21 | 88 | 1 | 0 | 1 | 10 | 44:1 | 44:5 | 1:1 |
| 22 | 22 | 4 | 41 | 0 | 15 | 40 | 1:14 | 1:10 | 41:15 |
| 23 | 23 | 80 | 15 | 0 | 1 | 4 | 5:1 | 20:1 | 15:1 |
| 24 | 24 | 4 | 67 | 0 | 1 | 28 | 1:17 | 1:7 | 67:1 |
| 25 | 25 | 5 | 79 | 0 | 1 | 15 | 1:16 | 1:3 | 79:1 |
| 26 | 26 | 14 | 1 | 0 | 50 | 35 | 14:51 | 14:35 | 1:50 |
| 27 | 27 | 75 | 2 | 0 | 1 | 22 | 25:1 | 75:22 | 2:1 |
| 28 | 28 | 60 | 34 | 0 | 1 | 5 | 12:7 | 12:1 | 34:1 |
| 29 | 29 | 10 | 50 | 0 | 10 | 30 | 1:6 | 1:3 | 5:1 |
| 30 | 30 | 39 | 40 | 0 | 1 | 20 | 39:41 | 39:20 | 40:1 |
| 31 | 31 | 54 | 1 | 0 | 20 | 25 | 12:3 | 54:25 | 1:20 |
| 32 | 32 | 4 | 42 | 0 | 10 | 44 | 1:13 | 1:11 | 21:5 |
| 33 | 33 | 88 | 7 | 0 | 1 | 4 | 11:1 | 22:1 | 7:1 |
| 34 | 34 | 70 | 10 | 0 | 13 | 7 | 70:23 | 10:1 | 10:13 |
| 35 | 35 | 60 | 3 | 0 | 3 | 34 | 10:1 | 30:17 | 1:1 |
| 36 | 36 | 50 | 35 | 0 | 5 | 10 | 5:4 | 5:1 | 7:1 |
| 37 | 37 | 75 | 5 | 0 | 15 | 5 | 15:4 | 15:1 | 1:3 |
| 38 | 38 | 9 | 80 | 0 | 1 | 10 | 1:9 | 9:10 | 80:1 |
| 39 | 39 | 13 | 1 | 0 | 51 | 35 | 1:4 | 13:35 | 1:51 |
| 40 | 40 | 60 | 10 | 0 | 15 | 15 | 12:5 | 4:1 | 2:3 |
| 41 | 41 | 25 | 5 | 0 | 40 | 30 | 5:9 | 5:6 | 1:8 |
| 42 | 42 | 75 | 1 | 0 | 4 | 20 | 15:1 | 15:4 | 1:4 |
| 43 | 43 | 85 | 4 | 0 | 1 | 10 | 17:1 | 17:2 | 4:1 |
| 44 | 44 | 20 | 45 | 0 | 20 | 15 | 4:13 | 4:3 | 9:4 |
| 45 | 45 | 20 | 45 | 0 | 20 | 15 | 4:13 | 4:3 | 9:4 |
| 46 | 46 | 80 | 5 | 0 | 5 | 10 | 8:1 | 8:1 | 1:1 |

TABLE 4

| Example | Slurry | FB | A | B | C | FBC | FB:(A + B + C) weight ratio | FB:FBC weight ratio | A:B weight ratio |
|---|---|---|---|---|---|---|---|---|---|
| 47 | 47 | 4 | 30 | 42 | 0 | 24 | 1:18 | 1:6 | 5:7 |
| 48 | 48 | 90 | 1 | 1 | 0 | 8 | 45:1 | 45:4 | 1:1 |
| 49 | 49 | 88 | 1 | 1 | 0 | 10 | 44:1 | 44:5 | 1:1 |
| 50 | 50 | 4 | 31 | 25 | 0 | 40 | 1:14 | 1:10 | 31:25 |
| 51 | 51 | 80 | 15 | 1 | 0 | 4 | 5:1 | 20:1 | 15:1 |
| 52 | 52 | 4 | 20 | 48 | 0 | 28 | 1:17 | 1:7 | 5:12 |
| 53 | 53 | 5 | 79 | 1 | 0 | 15 | 1:16 | 1:3 | 79:1 |
| 54 | 54 | 5 | 1 | 79 | 0 | 15 | 1:16 | 1:3 | 1:79 |
| 55 | 55 | 10 | 50 | 10 | 0 | 30 | 1:6 | 1:3 | 5:1 |
| 56 | 56 | 75 | 1 | 2 | 0 | 22 | 25:1 | 75:22 | 1:2 |
| 57 | 57 | 60 | 5 | 30 | 0 | 5 | 12:7 | 12:1 | 1:6 |
| 58 | 58 | 39 | 40 | 1 | 0 | 20 | 39:41 | 39:20 | 40:1 |
| 59 | 59 | 39 | 1 | 40 | 0 | 20 | 39:41 | 39:20 | 1:40 |
| 60 | 60 | 4 | 42 | 10 | 0 | 44 | 1:13 | 1:11 | 21:5 |
| 61 | 61 | 88 | 7 | 1 | 0 | 4 | 11:1 | 22:1 | 7:1 |
| 62 | 62 | 35 | 15 | 30 | 0 | 20 | 7:9 | 7:4 | 1:2 |
| 63 | 63 | 75 | 5 | 15 | 0 | 5 | 15:4 | 15:1 | 1:3 |
| 64 | 64 | 9 | 80 | 1 | 0 | 10 | 1:9 | 9:10 | 80:1 |
| 65 | 65 | 9 | 1 | 80 | 0 | 10 | 1:9 | 9:10 | 1:80 |
| 66 | 66 | 60 | 10 | 15 | 0 | 15 | 12:5 | 4:1 | 2:3 |
| 67 | 67 | 25 | 5 | 40 | 0 | 30 | 5:9 | 5:6 | 1:8 |
| 68 | 68 | 75 | 1 | 4 | 0 | 20 | 15:1 | 15:4 | 1:4 |
| 69 | 69 | 85 | 4 | 1 | 0 | 10 | 17:1 | 17:2 | 4:1 |
| 70 | 70 | 20 | 45 | 20 | 0 | 15 | 4:13 | 4:3 | 9:4 |
| 71 | 71 | 80 | 5 | 5 | 0 | 10 | 8:1 | 8:1 | 1:1 |

TABLE 5

| Example | Slurry | FB | A | B | C | FBC | FB:(A + B + C) weight ratio | FB:FBC weight ratio | (A + C):B weight ratio |
|---|---|---|---|---|---|---|---|---|---|
| 72 | 72 | 4 | 30 | 41 | 1 | 24 | 1:18 | 1:6 | 31:41 |
| 73 | 73 | 90 | 1 | 0.5 | 0.5 | 8 | 45:1 | 45:4 | 3:1 |
| 74 | 74 | 88 | 1 | 0.5 | 0.5 | 10 | 44:1 | 44:5 | 3:1 |
| 75 | 75 | 4 | 31 | 20 | 5 | 40 | 1:14 | 1:10 | 9:5 |
| 76 | 76 | 80 | 10 | 1 | 5 | 4 | 5:1 | 20:1 | 15:1 |
| 77 | 77 | 4 | 20 | 46 | 2 | 28 | 1:17 | 1:7 | 11:23 |
| 78 | 78 | 5 | 78 | 1 | 1 | 15 | 1:16 | 1:3 | 79:1 |

TABLE 5-continued

| Example | Slurry | FB | A | B | C | FBC | FB:(A + B + C) weight ratio | FB:FBC weight ratio | (A + C):B weight ratio |
|---|---|---|---|---|---|---|---|---|---|
| 79 | 79 | 8 | 1 | 80 | 1 | 10 | 4:41 | 4:5 | 1:40 |
| 80 | 80 | 10 | 40 | 10 | 10 | 30 | 1:6 | 1:3 | 5:1 |
| 81 | 81 | 75 | 1 | 1 | 1 | 22 | 25:1 | 75:22 | 2:1 |
| 82 | 82 | 60 | 5 | 29 | 1 | 5 | 12:7 | 12:1 | 6:29 |
| 83 | 83 | 39 | 39 | 1 | 1 | 20 | 39:41 | 39:20 | 40:1 |
| 84 | 84 | 48 | 1 | 40 | 1 | 10 | 8:7 | 24:5 | 1:20 |
| 85 | 85 | 4 | 32 | 10 | 10 | 44 | 1:13 | 1:11 | 21:5 |
| 86 | 86 | 88 | 6 | 1 | 1 | 4 | 11:1 | 22:1 | 7:1 |
| 87 | 87 | 35 | 15 | 25 | 5 | 20 | 7:9 | 7:4 | 4:5 |
| 88 | 88 | 75 | 10 | 5 | 5 | 5 | 15:4 | 15:1 | 3:1 |
| 89 | 89 | 9 | 20 | 1 | 60 | 10 | 1:9 | 9:10 | 80:1 |
| 90 | 90 | 6 | 1 | 82 | 1 | 10 | 1:14 | 3:5 | 1:41 |
| 91 | 91 | 60 | 5 | 10 | 10 | 15 | 12:5 | 4:1 | 3:2 |
| 92 | 92 | 25 | 4 | 1 | 40 | 30 | 5:9 | 5:6 | 44:1 |
| 93 | 93 | 75 | 0.5 | 0.5 | 4 | 20 | 15:1 | 15:4 | 9:1 |
| 94 | 94 | 85 | 2 | 2 | 1 | 10 | 17:1 | 17:2 | 3:2 |
| 95 | 95 | 20 | 20 | 25 | 20 | 15 | 4:13 | 4:3 | 8:5 |
| 96 | 96 | 80 | 5 | 4 | 1 | 10 | 8:1 | 8:1 | 3:2 |

TABLE 6

| | | FB | | A | | | FBC | |
|---|---|---|---|---|---|---|---|---|
| Example | Slurry | FB1 | FB2 | PET1 | PET2 | PET3 | FBC1 | FBC2 |
| 1 | 1 | 4 | | | 72 | | 24 | |
| 2 | 2 | 91 | | | | 1 | 8 | |
| 3 | 3 | 90 | | | | 1 | 9 | |
| 4 | 4 | | 4 | 56 | | | | 40 |
| 5 | 5 | | 80 | | 16 | | 4 | |
| 6 | 6 | 4 | | 30 | 38 | | | 28 |
| 7 | 7 | 80 | | 2 | | | 18 | |
| 8 | 8 | | 75 | | 10 | 10 | 5 | |
| 9 | 9 | 10 | | 10 | 20 | 30 | | 30 |
| 10 | 10 | 4 | | 10 | 30 | 12 | 44 | |
| 11 | 11 | 88 | | 8 | | | 4 | |
| 12 | 12 | 60 | | 25 | | | 15 | |
| 13 | 13 | 75 | | | 5 | | | 20 |
| 14 | 14 | | 30 | 5 | 55 | | 10 | |
| 15 | 15 | | 10 | 5 | 45 | | 40 | |
| 16 | 16 | | 85 | | 5 | | 10 | |
| 17 | 17 | | 20 | 20 | 25 | 20 | 15 | |
| 18 | 18 | 80 | | | 10 | | 10 | |

TABLE 7

| | | FB | | A | | | C | | FBC | |
|---|---|---|---|---|---|---|---|---|---|---|
| Example | Slurry | FB1 | FB2 | PET1 | PET2 | PET3 | PET6 | PET7 | FBC1 | FBC2 |
| 19 | 19 | 4 | | | 71 | | 1 | | 24 | |
| 20 | 20 | 90 | | | | 1 | | 1 | 8 | |
| 21 | 21 | 88 | | | | 1 | | 1 | 10 | |
| 22 | 22 | | 4 | 20 | 21 | | 15 | | | 40 |
| 23 | 23 | | 80 | 15 | | | | 1 | 4 | |
| 24 | 24 | 4 | | 30 | 37 | | 1 | | | 28 |
| 25 | 25 | 5 | | | 50 | 29 | 1 | | 15 | |
| 26 | 26 | 14 | | | 1 | | 50 | | 35 | |
| 27 | 27 | | 75 | 2 | | | | 1 | | 22 |
| 28 | 28 | 60 | | 34 | | | | 1 | 5 | |
| 29 | 29 | 10 | | 5 | 45 | | | 10 | | 30 |
| 30 | 30 | | 39 | | 20 | 20 | 1 | | 20 | |
| 31 | 31 | 54 | | 1 | | | 20 | | 25 | |
| 32 | 32 | 4 | | 10 | 20 | 12 | 10 | | 44 | |
| 33 | 33 | 88 | | 7 | | | | 1 | 4 | |
| 34 | 34 | | 70 | | 10 | | 13 | | | 7 |
| 35 | 35 | 60 | | 3 | | | | 3 | | 34 |
| 36 | 36 | 50 | | 35 | | | 5 | | 10 | |
| 37 | 37 | 75 | | 5 | | | 15 | | 5 | |
| 38 | 38 | | 9 | | | 80 | 1 | | 10 | |
| 39 | 39 | | 13 | 1 | | | | 51 | 35 | |
| 40 | 40 | 60 | | | 10 | | 15 | | 15 | |
| 41 | 41 | 25 | | 5 | | | 40 | | 30 | |
| 42 | 42 | 75 | | 1 | | | | 4 | | 20 |
| 43 | 43 | | 85 | | 4 | | 1 | | 10 | |
| 44 | 44 | | 20 | | 30 | 15 | 20 | | 15 | |
| 45 | 45 | | 20 | | 30 | 15 | 20 | | | 15 |
| 46 | 46 | 80 | | | 5 | | 5 | | | 10 |

TABLE 8

| | | FB | | A | | | B | | FBC | |
|---|---|---|---|---|---|---|---|---|---|---|
| Example | Slurry | FB1 | FB2 | PET1 | PET2 | PET3 | PET4 | PET5 | FBC1 | FBC2 |
| 47 | 47 | 4 | | | 30 | | 42 | | 24 | |
| 48 | 48 | 90 | | | | 1 | 1 | | 8 | |
| 49 | 49 | 88 | | | | 1 | 1 | | 10 | |
| 50 | 50 | | 4 | 10 | 21 | | | 25 | | 40 |
| 51 | 51 | | 80 | 15 | | | 1 | | 4 | |
| 52 | 52 | 4 | | | 20 | | 48 | | | 28 |
| 53 | 53 | 5 | | | 50 | 29 | 1 | | 15 | |
| 54 | 54 | 5 | | | 1 | | 79 | | 15 | |
| 55 | 55 | 10 | | 5 | 45 | | | 10 | 30 | |
| 56 | 56 | | 75 | 1 | | | 2 | | | 22 |
| 57 | 57 | 60 | | 5 | | | 30 | | 5 | |
| 58 | 58 | | 39 | | 20 | 20 | | 1 | 20 | |
| 59 | 59 | | 39 | 1 | | | 40 | | 20 | |
| 60 | 60 | 4 | | 10 | 20 | 12 | | 10 | 44 | |
| 61 | 61 | 88 | | 7 | | | | 1 | 4 | |
| 62 | 62 | 35 | | 15 | | | 30 | | | 20 |
| 63 | 63 | | 75 | 5 | | | 15 | | 5 | |
| 64 | 64 | | 9 | 80 | | | 1 | | 10 | |
| 65 | 65 | | 9 | 1 | | | | 80 | 10 | |
| 66 | 66 | 60 | | | 10 | | 15 | | 15 | |
| 67 | 67 | 25 | | 5 | | | | 40 | 30 | |
| 68 | 68 | 75 | | 1 | | | 4 | | | 20 |
| 69 | 69 | | 85 | | 4 | | 1 | | 10 | |
| 70 | 70 | | 20 | 20 | 25 | | 20 | | 15 | |
| 71 | 71 | 80 | | | 5 | | | 5 | | 10 |

TABLE 9

| | | FB | | A | | | B | | C | | FBC | |
|---|---|---|---|---|---|---|---|---|---|---|---|---|
| Example | Slurry | FB1 | FB2 | PET1 | PET2 | PET3 | PET4 | PET5 | PET6 | PET7 | FBC1 | FBC2 |
| 72 | 72 | 4 | | | 30 | | 41 | | 1 | | 24 | |
| 73 | 73 | 90 | | | | 1 | 0.5 | | 0.5 | | 8 | |
| 74 | 74 | 88 | | | | 1 | 0.5 | | 0.5 | | 10 | |
| 75 | 75 | | 4 | 10 | 21 | | | 20 | | 5 | | 40 |
| 76 | 76 | | 80 | 10 | | | 1 | | 5 | | 4 | |
| 77 | 77 | 4 | | 20 | | | 46 | | 2 | | | 28 |
| 78 | 78 | 5 | | 28 | 50 | | 1 | | 1 | | 15 | |
| 79 | 79 | | 8 | 1 | | | 80 | | 1 | | 10 | |
| 80 | 80 | 10 | | 40 | | | 10 | | | 10 | | 30 |
| 81 | 81 | | 75 | 1 | | | 1 | | | 1 | | 22 |
| 82 | 82 | 60 | | 5 | | | 29 | | 1 | | 5 | |
| 83 | 83 | | 39 | | 20 | 19 | 1 | | 1 | | 20 | |
| 84 | 84 | 48 | | 1 | | | 30 | 10 | | 1 | | 10 |
| 85 | 85 | 4 | | 10 | 22 | | 10 | | 10 | | 44 | |
| 86 | 86 | 88 | | 6 | | | 1 | | 1 | | 4 | |
| 87 | 87 | 35 | | 15 | | | 25 | | 5 | | 20 | |
| 88 | 88 | | 75 | 10 | | | 5 | | | 5 | 5 | |
| 89 | 89 | | 9 | 20 | | | 1 | | | 60 | 10 | |
| 90 | 90 | | 6 | 1 | | | | 82 | 1 | | 10 | |
| 91 | 91 | 60 | | | 10 | | | 10 | | 5 | 15 | |
| 92 | 92 | 25 | | 4 | | | 1 | | 40 | | 30 | |
| 93 | 93 | 75 | | 0.5 | | | 0.5 | | 4 | | | 20 |
| 94 | 94 | | 85 | 2 | | | 2 | | 1 | | 10 | |
| 95 | 95 | | 20 | 20 | | | 25 | | 20 | | 15 | |
| 96 | 96 | 80 | | | 5 | | | 4 | | 1 | | 10 |

TABLE 10

| Comparative | | FB | | A | | | B | | C | | D | FBC | |
|---|---|---|---|---|---|---|---|---|---|---|---|---|---|
| Example | Slurry | FB1 | FB2 | PET1 | PET2 | PET3 | PET4 | PET5 | PET6 | PET7 | PET8 | FBC1 | FBC2 |
| 1 | 97 | 90 | | | | | 1 | | | | | 9 | |
| 2 | 98 | 60 | | | | | | 25 | | | | 15 | |
| 3 | 99 | 80 | | | | | | | 2 | | | 18 | |

TABLE 10-continued

| Comparative | | FB | | A | | | B | | C | | D | FBC | |
|---|---|---|---|---|---|---|---|---|---|---|---|---|---|
| Example | Slurry | FB1 | FB2 | PET1 | PET2 | PET3 | PET4 | PET5 | PET6 | PET7 | PET8 | FBC1 | FBC2 |
| 4 | 100 | 75 | | | | | | | | 5 | | 20 | |
| 5 | 101 | | 20 | | | | | 65 | | | | 15 | |
| 6 | 102 | 10 | | | | | | 30 | 30 | | | | 30 |
| 7 | 103 | | 40 | | 30 | | | | | | 30 | | |
| 8 | 104 | 50 | | | | | 50 | | | | | | |
| 9 | 105 | 50 | | | 50 | | | | | | | | |
| 10 | 106 | | | | | | 70 | | | | 30 | | |
| 11 | 107 | | | | 50 | | | | | | | | 50 |

Examples 1 to 96

Slurries 1 to 96 were subjected to wet papermaking process to produce porous sheets 1 to 96. Next, the porous sheets 1 to 96 were subjected to calendaring treatment under the conditions shown in Table 11 to produce separators for an electric double layer capacitor 1 to 96. A combination papermaking machine consisting of a cylinder papermaking machine and an inclined short-wire papermaking machine was used for the papermaking machine.

Comparative Examples 1 to 7, 10 and 11

Slurries 97 to 103, 106 and 107 were subjected to wet papermaking process to produce porous sheets 97 to 103, 106 and 107. Next, the porous sheets 97 to 103, 106 and 107 were subjected to calendaring treatment under the conditions shown in Table 11 to produce separators for an electrical double layer capacitor 97 to 103, 106 and 107. A combination papermaking machine consisting of a cylinder papermaking machine and an inclined short-wire papermaking machine was used for the papermaking machine.

Comparative Examples 8 and 9

Slurries 104 and 105 were subjected to wet papermaking process to produce porous sheets 104 and 105. Next, the porous sheets 104 and 105 were subjected to hot calendaring treatment by passing through between a pair of metal rollers under conditions of a temperature of 220° C. and line pressure of 4.7 kN/cm to produce separators for an electric double layer capacitor 104 and 105.

TABLE 11

| Example | Line pressure N/cm |
|---|---|
| 1 | 250 |
| 2 | 300 |
| 3 | 300 |
| 4 | 250 |
| 5 | 250 |
| 6 | 300 |
| 7 | 250 |
| 8 | 300 |
| 9 | 400 |
| 10 | 300 |
| 11 | 250 |
| 12 | 300 |
| 13 | 400 |
| 14 | 300 |
| 15 | 250 |
| 16 | 0 |
| 17 | 400 |
| 18 | 400 |
| 19 | 250 |
| 20 | 300 |
| 21 | 300 |
| 22 | 250 |
| 23 | 250 |
| 24 | 300 |
| 25 | 300 |
| 26 | 440 |
| 27 | 250 |
| 28 | 250 |
| 29 | 440 |
| 30 | 250 |
| 31 | 250 |
| 32 | 300 |
| 33 | 250 |
| 34 | 120 |
| 35 | 250 |
| 36 | 250 |
| 37 | 300 |
| 38 | 460 |
| 39 | 350 |
| 40 | 300 |
| 41 | 350 |
| 42 | 250 |
| 43 | 0 |
| 44 | 440 |
| 45 | 440 |
| 46 | 400 |
| 47 | 250 |
| 48 | 300 |
| 49 | 300 |
| 50 | 250 |
| 51 | 250 |
| 52 | 250 |
| 53 | 300 |
| 54 | 300 |
| 55 | 420 |
| 56 | 250 |
| 57 | 250 |
| 58 | 250 |
| 59 | 250 |
| 60 | 300 |
| 61 | 250 |
| 62 | 250 |
| 63 | 300 |
| 64 | 460 |
| 65 | 480 |
| 66 | 300 |
| 67 | 350 |
| 68 | 250 |
| 69 | 0 |
| 70 | 440 |
| 71 | 400 |
| 72 | 250 |
| 73 | 300 |
| 74 | 300 |

TABLE 11-continued

| | Line pressure N/cm |
|---|---|
| 75 | 250 |
| 76 | 250 |
| 77 | 250 |
| 78 | 300 |
| 79 | 300 |
| 80 | 420 |
| 81 | 250 |
| 82 | 250 |
| 83 | 250 |
| 84 | 250 |
| 85 | 300 |
| 86 | 250 |
| 87 | 250 |
| 88 | 300 |
| 89 | 460 |
| 90 | 350 |
| 91 | 300 |
| 92 | 350 |
| 93 | 250 |
| 94 | 0 |
| 95 | 440 |
| 96 | 400 |
| Comparative example | |
| 1 | 250 |
| 2 | 300 |
| 3 | 250 |
| 4 | 250 |
| 5 | 440 |
| 6 | 350 |
| 7 | 4700 |
| 8 | 4700 |
| 9 | 350 |
| 10 | 400 |

<Electric Double Layer Capacitors 1 to 107>

An electrode composed of graphite-based carbon doped with lithium ions was used for the anode, while an electrode composed of non-porous carbon was used for the cathode. The each of the separators for an electric double layer capacitor 1 to 107, the anode and the cathode were laminated in the order of separator, anode, separator and cathode, and this lamination was taken as one unit. 25 units of the lamination were laminated to prepare an assembly. The assembly was housed in an aluminum storage pouch with arranging a separator on the outside of the outmost cathode, to form a stacked element. After injecting electrolyte into the element, air was degassed from the injection port, and the injection port was sealed to produce 100 each of electric double layer capacitors 1 to 107. A 1.5 mol/l solution of $(C_2H_5)_3(CH_3)NBF_4$ dissolved in propylene carbonate was used for the electrolyte.

The separators for an electric double layer capacitor 1 to 107 and the electric double layer capacitors 1 to 107 were measured according to the test methods described below. Those results are shown in Tables 12 to 16.

<Thickness>

The thicknesses of the separators for an electric double layer capacitor 1 to 107 were measured in compliance with JIS C2111. Those results are shown in Tables 12 to 16.

<Density>

The densities of the separators for an electric double layer capacitor 1 to 107 were measured in compliance with JIS C2111. Those results are shown in Tables 12 to 16.

<Cutability>

The status of the cross-sections of the separators for an electric double layer capacitor 1 to 107 was observed when cut with a straw cutter. Separators able to be cut easily without producing fuzz were evaluated as A, those that were cut with some difficulty were evaluated as B, and those that produced fuzz or exhibited defective cutting were evaluated as C. Those results are shown in Tables 12 to 16.

<Static Friction Coefficient>

A 100 g weight consisting of a rectangular solid having a vertical and horizontal length of 25 mm and height of 20 mm was used. Separators for an electric double layer capacitor 1 to 107 were affixed to a smooth aluminum plate, and the aluminum plate was attached to an inclined plate of a sliding inclination angle measuring device with the separator sample side facing upward. At the same time, separator samples identical to the separator sample on the inclined plate were attached to the weight, the angle of the inclined plate was set to zero and the weight separator samples were placed on the separator sample on the inclined plate with the weight separator sample side facing downward. At that time, the weight separator samples were placed on the separator sample on the inclined plate bringing the same faces in contact, namely, bringing the front face of the weight separators in contact with the front face of the separator samples on the inclined plate, or the back face in contact with the back face. The angle of the inclined plate was then increased at the rate of 3 degrees or less per second in compliance with the inclination method of JIS P8147, and the inclination angle θ when the weight began to slide was read from the measuring device. The tangent tan θ when the weight began to slide was determined as the static friction coefficient, and the mean value of the static friction coefficient between the front faces and the static friction coefficient between the back faces of each separator sample is shown in Tables 12 to 16.

<Puncture Strength when Impregnated with an Electrolyte>

The separators for an electric double layer capacitor 1 to 107 were cut into strips having a width of 50 mm, and immersed in propylene carbonate for 10 minutes. The strips were then hung up for 1 minute, and after removing excess propylene carbonate adhered to the samples, the puncture strength of the samples was measured. A metal needle having a rounded tip with curvature of 1.6 and a diameter of 1 mm was attached to a desktop material tester (Orientech Co., Ltd., trade name: STA-1150) and moved vertically downward to the sample surface at a constant speed of 1 mm/s until it passed through the sample. The maximum load (N) at that time was measured, and that value was taken as puncture strength when impregnated with an electrolyte. Puncture strength was measured at five locations for each sample, and the mean values of all measured values are shown in Tables 12 to 16.

<Internal Resistance>

Internal resistance was calculated from the voltage drop immediately after the start of discharge when the electric double layer capacitors 1 to 107 were charged at a voltage of 3.5 V and then discharged at a constant current of 20 A. The mean values for 100 capacitors are shown in Tables 12 to 16.

<Leakage Current>

Current values measured after charging the electric double layer capacitors 1 to 107 at a voltage of 3.5 V and holding for 24 hours were used as indicators of leakage current and shown in Tables 12 to 16. The lower the leakage current the better.

<Capacitance Retention Rate>

The ratio of capacitance when the electric double layer capacitors 1 to 107 were repeatedly subjected to 5000 cycles of charging at a voltage of 3.5 V followed by discharging to 0 V at a constant current of 20 A at 50° C. to the initial capacitance at room temperature was used as an indicator of capacitance retention rate, and those values are shown in Tables 12 to 16.

<Fluctuation>

Capacitance when the electric double layer capacitors 1 to 107 were charged at a voltage of 3.5 V and then discharged to 0 V at a constant current of 20 A was calculated. Standard deviations of fluctuations in capacitance for 100 of each electric double layer capacitor are shown in Tables 12 to 16.

<Vibration Resistance>

The electric double layer capacitors 1 to 107 were attached to a longitudinal vibration tester (Idex Co., Ltd., trade name: BF-45UA-E), and capacitance was measured after applying vibrations of 5 Hz for 3000 hours at room temperature. The ratio of the measured capacitance to initial capacitance was calculated as a percentage and used as an indicator of vibration resistance, and shown in Tables 12 to 16. The larger the value of vibration resistance the better.

TABLE 12

| Example | Separator | Thickness μm | Density g/cm$^3$ | Friction coefficient | Cutability | Puncture strength N | Capacitor | Internal resistance mΩ | Leakage current mA | Capacitance retention rate % | Fluctuation σ | Vibration resistance % |
|---|---|---|---|---|---|---|---|---|---|---|---|---|
| 1 | 1 | 60 | 0.52 | 0.38 | A | 3.27 | 1 | 6.4 | 1.05 | 62 | 7.7 | 94 |
| 2 | 2 | 50 | 0.62 | 0.60 | B | 0.22 | 2 | 14.5 | 0.80 | 85 | 11.0 | 68 |
| 3 | 3 | 50 | 0.62 | 0.60 | A | 0.23 | 3 | 14.5 | 0.77 | 85 | 11.0 | 68 |
| 4 | 4 | 60 | 0.51 | 0.43 | A | 1.81 | 4 | 5.7 | 0.42 | 70 | 8.8 | 84 |
| 5 | 5 | 60 | 0.57 | 0.58 | A | 0.48 | 5 | 11.9 | 0.73 | 86 | 9.7 | 71 |
| 6 | 6 | 60 | 0.56 | 0.40 | A | 2.82 | 6 | 7.0 | 0.70 | 72 | 7.3 | 91 |
| 7 | 7 | 60 | 0.54 | 0.53 | A | 0.44 | 7 | 13.5 | 0.67 | 82 | 11.0 | 70 |
| 8 | 8 | 50 | 0.57 | 0.54 | A | 0.48 | 8 | 11.1 | 0.82 | 88 | 8.5 | 71 |
| 9 | 9 | 40 | 0.65 | 0.38 | A | 1.86 | 9 | 6.3 | 0.43 | 68 | 7.8 | 84 |
| 10 | 10 | 50 | 0.56 | 0.36 | A | 1.78 | 10 | 7.3 | 0.42 | 65 | 9.0 | 83 |
| 11 | 11 | 60 | 0.57 | 0.60 | B | 0.43 | 11 | 12.6 | 0.95 | 84 | 10.2 | 70 |
| 12 | 12 | 30 | 0.52 | 0.53 | A | 0.80 | 12 | 9.7 | 0.66 | 78 | 8.6 | 78 |
| 13 | 13 | 60 | 0.40 | 0.54 | A | 0.72 | 13 | 12.1 | 0.66 | 84 | 10.6 | 75 |
| 14 | 14 | 40 | 0.60 | 0.48 | A | 1.82 | 14 | 6.0 | 0.60 | 80 | 7.0 | 84 |
| 15 | 15 | 60 | 0.46 | 0.43 | A | 1.78 | 15 | 6.5 | 0.51 | 70 | 8.1 | 83 |
| 16 | 16 | 80 | 0.27 | 0.71 | A | 0.46 | 16 | 12.3 | 1.10 | 73 | 9.9 | 70 |
| 17 | 17 | 40 | 0.60 | 0.50 | A | 2.65 | 17 | 5.8 | 0.43 | 80 | 6.5 | 89 |
| 18 | 18 | 30 | 0.70 | 0.52 | A | 0.46 | 18 | 17.2 | 0.41 | 70 | 10.0 | 70 |

TABLE 13

| Example | Separator | Thickness μm | Density g/cm$^3$ | Friction coefficient | Cutability | Puncture strength N | Capacitor | Internal resistance mΩ | Leakage current mA | Capacitance retention rate % | Fluctuation σ | Vibration resistance % |
|---|---|---|---|---|---|---|---|---|---|---|---|---|
| 19 | 19 | 60 | 0.52 | 0.38 | A | 3.53 | 19 | 5.8 | 1.21 | 63 | 7.5 | 95 |
| 20 | 20 | 50 | 0.62 | 0.63 | B | 0.30 | 20 | 12.8 | 0.88 | 86 | 10.5 | 68 |
| 21 | 21 | 50 | 0.62 | 0.63 | A | 0.35 | 21 | 12.5 | 0.84 | 86 | 10.5 | 68 |
| 22 | 22 | 60 | 0.51 | 0.43 | A | 2.61 | 22 | 4.6 | 0.49 | 71 | 8.4 | 88 |
| 23 | 23 | 60 | 0.57 | 0.60 | A | 0.67 | 23 | 11.0 | 0.96 | 88 | 9.5 | 72 |
| 24 | 24 | 60 | 0.56 | 0.42 | A | 3.30 | 24 | 6.0 | 0.80 | 73 | 7.2 | 94 |
| 25 | 25 | 60 | 0.52 | 0.43 | A | 3.74 | 25 | 5.5 | 0.60 | 73 | 7.5 | 95 |
| 26 | 26 | 50 | 0.64 | 0.39 | A | 1.70 | 26 | 4.0 | 0.55 | 70 | 11.0 | 83 |
| 27 | 27 | 60 | 0.56 | 0.60 | A | 0.60 | 27 | 12.0 | 0.80 | 81 | 10.5 | 72 |
| 28 | 28 | 60 | 0.52 | 0.58 | A | 1.80 | 28 | 8.3 | 0.68 | 89 | 8.6 | 84 |
| 29 | 29 | 40 | 0.65 | 0.42 | A | 3.16 | 29 | 5.3 | 0.50 | 70 | 7.6 | 93 |
| 30 | 30 | 60 | 0.58 | 0.52 | A | 2.08 | 30 | 8.2 | 0.56 | 80 | 7.4 | 85 |
| 31 | 31 | 60 | 0.52 | 0.56 | A | 1.66 | 31 | 6.5 | 0.63 | 84 | 9.8 | 82 |
| 32 | 32 | 50 | 0.56 | 0.40 | A | 2.43 | 32 | 6.6 | 0.45 | 71 | 8.6 | 87 |
| 33 | 33 | 60 | 0.57 | 0.61 | B | 0.51 | 33 | 11.8 | 1.06 | 85 | 10.4 | 70 |
| 34 | 34 | 70 | 0.36 | 0.67 | A | 1.75 | 34 | 7.0 | 1.10 | 87 | 8.0 | 83 |
| 35 | 35 | 60 | 0.55 | 0.58 | A | 0.53 | 35 | 11.2 | 0.69 | 81 | 10.5 | 70 |
| 36 | 36 | 60 | 0.51 | 0.54 | A | 1.92 | 36 | 6.3 | 0.65 | 87 | 7.8 | 85 |
| 37 | 37 | 50 | 0.57 | 0.62 | A | 1.43 | 37 | 7.4 | 0.70 | 90 | 8.2 | 80 |
| 38 | 38 | 40 | 0.65 | 0.42 | A | 3.72 | 38 | 5.4 | 0.50 | 66 | 7.0 | 95 |
| 39 | 39 | 50 | 0.54 | 0.40 | A | 1.60 | 39 | 3.6 | 0.63 | 66 | 11.7 | 82 |
| 40 | 40 | 30 | 0.52 | 0.52 | A | 1.77 | 40 | 6.7 | 0.73 | 82 | 8.3 | 83 |
| 41 | 41 | 50 | 0.51 | 0.45 | A | 2.35 | 41 | 4.4 | 0.53 | 79 | 9.6 | 86 |
| 42 | 42 | 60 | 0.46 | 0.60 | A | 0.84 | 42 | 10.9 | 0.75 | 86 | 10.2 | 76 |
| 43 | 43 | 80 | 0.27 | 0.72 | A | 0.70 | 43 | 11.5 | 1.22 | 75 | 9.5 | 73 |
| 44 | 44 | 40 | 0.60 | 0.50 | A | 3.60 | 44 | 5.0 | 0.52 | 82 | 6.0 | 95 |
| 45 | 45 | 40 | 0.60 | 0.50 | A | 3.56 | 45 | 5.0 | 0.56 | 81 | 6.3 | 95 |
| 46 | 46 | 30 | 0.70 | 0.53 | A | 0.90 | 46 | 15.6 | 0.50 | 72 | 9.5 | 76 |

TABLE 14

| Example | Separator | Thickness μm | Density g/cm³ | Friction coefficient | Cutability | Puncture strength N | Capacitor | Internal resistance mΩ | Leakage current mA | Capacitance retention rate % | Fluctuation σ | Vibration resistance % |
|---|---|---|---|---|---|---|---|---|---|---|---|---|
| 47 | 47 | 60 | 0.52 | 0.38 | A | 3.43 | 47 | 6.6 | 1.10 | 66 | 7.2 | 94 |
| 48 | 48 | 50 | 0.62 | 0.61 | B | 0.27 | 48 | 14.6 | 0.85 | 88 | 10.3 | 67 |
| 49 | 49 | 50 | 0.62 | 0.61 | A | 0.32 | 49 | 14.6 | 0.80 | 88 | 10.3 | 68 |
| 50 | 50 | 60 | 0.55 | 0.43 | A | 2.44 | 50 | 6.0 | 0.46 | 74 | 7.9 | 85 |
| 51 | 51 | 60 | 0.57 | 0.58 | A | 0.60 | 51 | 12.2 | 0.92 | 91 | 9.2 | 72 |
| 52 | 52 | 60 | 0.56 | 0.41 | A | 3.19 | 52 | 7.3 | 0.75 | 76 | 7.0 | 92 |
| 53 | 53 | 60 | 0.52 | 0.48 | A | 3.65 | 53 | 6.2 | 0.57 | 80 | 7.1 | 95 |
| 54 | 54 | 60 | 0.56 | 0.41 | A | 1.56 | 54 | 6.6 | 0.54 | 75 | 10.8 | 81 |
| 55 | 55 | 40 | 0.65 | 0.38 | A | 2.86 | 55 | 6.6 | 0.45 | 71 | 7.3 | 90 |
| 56 | 56 | 60 | 0.56 | 0.59 | A | 0.50 | 56 | 12.6 | 0.75 | 84 | 10.3 | 70 |
| 57 | 57 | 60 | 0.52 | 0.52 | A | 2.13 | 57 | 9.3 | 0.61 | 92 | 8.0 | 85 |
| 58 | 58 | 60 | 0.58 | 0.51 | A | 1.97 | 58 | 8.8 | 0.52 | 83 | 7.2 | 84 |
| 59 | 59 | 60 | 0.58 | 0.50 | A | 2.48 | 59 | 9.0 | 0.54 | 82 | 8.7 | 86 |
| 60 | 60 | 50 | 0.56 | 0.42 | A | 2.30 | 60 | 7.5 | 0.43 | 74 | 8.2 | 86 |
| 61 | 61 | 60 | 0.57 | 0.60 | B | 0.44 | 61 | 12.9 | 0.92 | 89 | 9.7 | 68 |
| 62 | 62 | 60 | 0.50 | 0.50 | A | 2.46 | 62 | 9.0 | 0.58 | 82 | 7.4 | 86 |
| 63 | 63 | 50 | 0.57 | 0.55 | A | 1.28 | 63 | 11.7 | 0.67 | 92 | 7.9 | 78 |
| 64 | 64 | 40 | 0.65 | 0.40 | A | 3.67 | 64 | 6.3 | 0.47 | 68 | 6.7 | 95 |
| 65 | 65 | 40 | 0.65 | 0.37 | A | 1.35 | 65 | 6.6 | 0.60 | 67 | 11.5 | 78 |
| 66 | 66 | 30 | 0.52 | 0.55 | A | 1.55 | 66 | 10.5 | 0.67 | 84 | 7.9 | 80 |
| 67 | 67 | 50 | 0.51 | 0.45 | A | 2.50 | 67 | 5.1 | 0.48 | 82 | 9.0 | 87 |
| 68 | 68 | 60 | 0.40 | 0.58 | A | 0.70 | 68 | 12.4 | 0.70 | 89 | 9.8 | 73 |
| 69 | 69 | 80 | 0.27 | 0.71 | A | 0.66 | 69 | 12.8 | 1.13 | 77 | 9.2 | 72 |
| 70 | 70 | 40 | 0.60 | 0.50 | A | 3.28 | 70 | 6.2 | 0.50 | 83 | 5.6 | 93 |
| 71 | 71 | 30 | 0.70 | 0.52 | A | 0.82 | 71 | 18.0 | 0.50 | 73 | 9.1 | 75 |

TABLE 15

| Example | Separator | Thickness μm | Density g/cm³ | Friction coefficient | Cutability | Puncture strength N | Capacitor | Internal resistance mΩ | Leakage current mA | Capacitance retention rate % | Fluctuation σ | Vibration resistance % |
|---|---|---|---|---|---|---|---|---|---|---|---|---|
| 72 | 72 | 60 | 0.52 | 0.38 | A | 3.50 | 72 | 6.1 | 1.15 | 65 | 7.0 | 95 |
| 73 | 73 | 50 | 0.62 | 0.62 | B | 0.30 | 73 | 13.5 | 0.86 | 87 | 10.1 | 68 |
| 74 | 74 | 50 | 0.62 | 0.62 | A | 0.34 | 74 | 13.4 | 0.83 | 87 | 10.0 | 68 |
| 75 | 75 | 60 | 0.51 | 0.42 | A | 2.70 | 75 | 5.2 | 0.48 | 72 | 7.5 | 88 |
| 76 | 76 | 60 | 0.57 | 0.60 | A | 0.63 | 76 | 11.3 | 0.94 | 90 | 8.9 | 72 |
| 77 | 77 | 60 | 0.56 | 0.41 | A | 3.61 | 77 | 6.4 | 0.80 | 75 | 6.8 | 95 |
| 78 | 78 | 60 | 0.52 | 0.43 | A | 3.80 | 78 | 5.7 | 0.59 | 73 | 6.5 | 95 |
| 79 | 79 | 60 | 0.64 | 0.38 | A | 1.66 | 79 | 5.5 | 0.47 | 68 | 10.5 | 82 |
| 80 | 80 | 40 | 0.65 | 0.41 | A | 3.27 | 80 | 5.8 | 0.48 | 70 | 7.1 | 93 |
| 81 | 81 | 60 | 0.56 | 0.59 | A | 0.65 | 81 | 12.2 | 0.77 | 82 | 10.1 | 72 |
| 82 | 82 | 60 | 0.52 | 0.58 | A | 2.26 | 82 | 8.8 | 0.64 | 90 | 7.0 | 86 |
| 83 | 83 | 60 | 0.58 | 0.53 | A | 2.17 | 83 | 8.5 | 0.55 | 81 | 5.3 | 86 |
| 84 | 84 | 50 | 0.55 | 0.56 | A | 1.20 | 84 | 6.0 | 0.63 | 83 | 7.4 | 78 |
| 85 | 85 | 50 | 0.56 | 0.43 | A | 2.56 | 85 | 6.9 | 0.44 | 72 | 8.0 | 87 |
| 86 | 86 | 60 | 0.57 | 0.61 | B | 0.58 | 86 | 12.2 | 0.95 | 87 | 9.4 | 72 |
| 87 | 87 | 60 | 0.50 | 0.53 | A | 2.55 | 87 | 5.7 | 0.58 | 84 | 5.5 | 87 |
| 88 | 88 | 50 | 0.57 | 0.54 | A | 1.34 | 88 | 10.5 | 0.68 | 91 | 10.2 | 79 |
| 89 | 89 | 40 | 0.65 | 0.42 | A | 3.70 | 89 | 5.8 | 0.66 | 63 | 6.5 | 95 |
| 90 | 90 | 60 | 0.54 | 0.40 | A | 1.62 | 90 | 4.0 | 0.56 | 65 | 11.2 | 82 |
| 91 | 91 | 30 | 0.52 | 0.52 | A | 1.70 | 91 | 9.1 | 0.72 | 82 | 8.0 | 83 |
| 92 | 92 | 50 | 0.51 | 0.46 | A | 2.38 | 92 | 4.6 | 0.51 | 80 | 8.8 | 87 |
| 93 | 93 | 60 | 0.48 | 0.59 | A | 0.80 | 93 | 11.5 | 0.73 | 83 | 9.5 | 74 |
| 94 | 94 | 80 | 0.27 | 0.71 | A | 0.70 | 94 | 11.7 | 1.20 | 77 | 8.9 | 73 |
| 95 | 95 | 40 | 0.60 | 0.50 | A | 3.68 | 95 | 5.3 | 0.51 | 83 | 5.2 | 95 |
| 96 | 96 | 30 | 0.70 | 0.52 | A | 0.86 | 96 | 16.4 | 0.44 | 73 | 8.9 | 76 |

TABLE 16

| Comparative Example | Separator | Thickness μm | Density g/cm³ | Friction coefficient | Cutability | Puncture strength N | Capacitor | Internal resistance mΩ | Leakage current mA | Capacitance retention rate % | Fluctuation σ | Vibration resistance % |
|---|---|---|---|---|---|---|---|---|---|---|---|---|
| 1 | 97 | 50 | 0.62 | 0.61 | C | 0.25 | 97 | 15.1 | 0.89 | 82 | 12.0 | 67 |
| 2 | 98 | 30 | 0.52 | 0.54 | C | 1.33 | 98 | 11.7 | 0.77 | 73 | 13.5 | 78 |
| 3 | 99 | 60 | 0.57 | 0.60 | C | 0.35 | 99 | 12.8 | 0.83 | 68 | 15.0 | 69 |

TABLE 16-continued

| Comparative Example | Separator | Thickness μm | Density g/cm$^3$ | Friction coefficient | Cutability | Puncture strength N | Capacitor | Internal resistance mΩ | Leakage current mA | Capacitance retention rate % | Fluctuation σ | Vibration resistance % |
|---|---|---|---|---|---|---|---|---|---|---|---|---|
| 4 | 100 | 60 | 0.40 | 0.59 | C | 0.60 | 100 | 10.0 | 0.86 | 77 | 13.2 | 72 |
| 5 | 101 | 40 | 0.65 | 0.50 | A | 3.11 | 101 | 7.3 | 1.65 | 61 | 8.0 | 90 |
| 6 | 102 | 40 | 0.65 | 0.41 | A | 2.98 | 102 | 7.0 | 1.34 | 59 | 8.4 | 90 |
| 7 | 103 | 60 | 0.33 | 0.55 | A | 4.38 | 103 | 27.3 | 11.82 | 70 | 14.5 | 96 |
| 8 | 104 | 25 | 0.80 | 0.40 | A | 0.52 | 104 | 32.4 | 5.66 | 74 | 13.7 | 71 |
| 9 | 105 | 40 | 0.80 | 0.40 | A | 0.43 | 105 | 30.2 | 5.51 | 76 | 13.2 | 68 |
| 10 | 106 | 50 | 0.60 | 0.36 | A | 4.54 | 106 | 25.1 | 19.39 | 52 | 14.1 | 96 |
| 11 | 107 | 40 | 0.70 | 0.32 | A | 0.14 | 107 | 26.2 | 0.42 | 43 | 16.6 | 50 |

As shown in Tables 12 to 15, the separators for an electric double layer capacitor 1 to 96 produced in Examples 1 to 96 comprise a porous sheet containing fibrillated heat-resistant fibers, polyester fibers and fibrillated cellulose, wherein the polyester fibers are polyester fibers "A" having a fineness of 0.01 dtex to less than 0.10 dtex.

On the other hand, as shown in Table 16, the separators for an electric double layer capacitor 97 to 100 produced in Comparative Examples 1 to 4 do not contain the polyester fibers "A" having a fineness of 0.01 dtex to less than 0.10 dtex. Therefore, all of these separators demonstrated poor cutability, and had larger leakage currents, larger capacitance fluctuations and lower electrostatic retention rates in comparison with the separators for an electric double layer capacitor 1 to 96 of Examples 1 to 96 containing polyester fibers "A".

The separator for an electric double layer capacitor 101 produced in Comparative Example 5 contains only polyester fibers "B" having a fineness of 0.10 to 0.45 dtex, without containing polyester fibers "A" having a fineness of 0.01 dtex to less than 0.10 dtex. Therefore, the leakage current was somewhat larger, capacitance retention rate was lower and capacitance fluctuations were larger in comparison with the separators for an electric double layer capacitor 1 to 96 of Examples 1 to 96.

The separator for an electric double layer capacitor 102 produced in Comparative Example 6 contains only polyester fibers "B" having a fineness of 0.10 to 0.45 dtex and polyester fibers "C" having a fineness of greater than 0.45 dtex to less than 1.00 dtex, but does not contain polyester fibers "A" having a fineness of 0.01 dtex to less than 0.10 dtex. Therefore, the leakage current was somewhat larger, capacitance retention rate was lower and capacitance fluctuations were larger in comparison with the separators for an electric double layer capacitor 1 to 96 of Examples 1 to 96.

The separators for an electric double layer capacitor 103 to 105 produced in Comparative Examples 7 to 9 do not contain fibrillated cellulose. Therefore, the internal resistance was higher, leakage current was larger and capacitance fluctuations were larger in comparison with the separators for an electric double layer capacitor 1 to 96 of Examples 1 to 96.

The separator for an electric double layer capacitor 106 produced in Comparative Example 10 does not contain fibrillated heat-resistant fibers, polyester fibers "A" having a fineness of 0.01 dtex to less than 0.10 dtex or fibrillated cellulose. Therefore, internal resistance was higher, leakage current was exceptionally larger, capacitance retention rate was lower and capacitance fluctuations were larger in comparison with the separators for an electric double layer capacitor 1 to 96 of Examples 1 to 96.

The separator for an electric double layer capacitor 107 produced in Comparative Example 11 comprises only polyester fibers "A" having a fineness of 0.01 dtex to less than 0.10 dtex and fibrillated cellulose without containing fibrillated heat-resistant fibers. Therefore, internal resistance was higher, capacitance retention rate was lower, capacitance fluctuations were larger and vibration resistance was poor in comparison with the separators for an electric double layer capacitor 1 to 96 of Examples 1 to 96.

The following describes a comparison of the separators for an electric double layer capacitor 1 to 96 of Examples 1 to 96. As shown in Table 12, the separators for an electric double layer capacitor 1 to 18 produced in Examples 1 to 18 contain polyester fibers "A" having a fineness of 0.01 dtex to less than 0.10 dtex as polyester fibers. As shown in Table 13, the separators for an electric double layer capacitor 19 to 46 produced in Examples 19 to 46 contain polyester fibers "A" having a fineness of 0.01 dtex to less than 0.10 dtex, and polyester fibers "C" having a fineness of greater than 0.45 dtex to less than 1.00 dtex as polyester fibers. As shown in Table 14, the separators for an electric double layer capacitor 47 to 71 produced in Examples 47 to 71 contain polyester fibers "A" having a fineness of 0.01 dtex to less than 0.10 dtex, and polyester fibers "B" having a fineness of 0.10 to 0.45 dtex as polyester fibers. As shown in Table 15, the separators for an electric double layer capacitor 72 to 96 produced in Examples 72 to 96 contain polyester fibers "A" having a fineness of 0.01 dtex to less than 0.10 dtex, polyester fibers "B" having a fineness of 0.10 to 0.45 dtex, and polyester fibers "C" having a fineness of greater than 0.45 dtex to less than 1.00 dtex as polyester fibers.

In the case of comparing separators for an electric double layer capacitor in which the weight ratio of fibrillated heat-resistant fibers to the total amount of polyester fibers and the weight ratio of fibrillated heat-resistant fibers to fibrillated cellulose are the same, but the finenesses of the polyester fibers are different, the separators for an electric double layer capacitor 1 to 18 of Examples 1 to 18, containing polyester fibers "A" as polyester fibers, were superior to the separators for an electric double layer capacitor 19 to 96 of Examples 19 to 96, containing polyester fibers "B" and "C" but not polyester fibers "A", in terms of smaller leakage current. For example, in a comparison of Examples 1, 19, 47 and 72, in which the weight ratio of FB:(A+B+C) is 1:18 and the weight ratio of FB:FBC is 1:6 in common, Example 1 is superior in an evaluation of leakage current as a result of having the smallest leakage current.

In the case of comparing separators for an electric double layer capacitor in which the weight ratio of fibrillated heat-resistant fibers to the total amount of polyester fibers and the weight ratio of fibrillated heat-resistant fibers to fibrillated cellulose are the same, but the finenesses of the polyester fibers are different, the separators for an electric double layer capacitor 19 to 46 of Examples 19 to 46 containing polyester fibers "A" and "C" have lower internal resistance and higher puncture strength when impregnated with an electrolyte, thereby making them superior in terms of vibration resistance in a comparison with the separators for an electric double layer capacitor 1 to 18 of Examples 1 to 18 containing only polyester fibers “A”, separators for an electric double layer capacitor 47 to 71 produced in Examples 47 to 71 containing polyester fibers “A.” and “B”, and separators for an electric double layer capacitor 72 to 96 of Examples 72 to 96 containing polyester fibers “A”, “B” and “C”. For example, in a comparison of Examples 1, 19, 47 and 72, in which the weight ratio of FB:(A+B+C) is 1:18 and the weight ratio of FB:FBC is 1:6 in common, Example 19 is the most superior in an evaluation of internal resistance, puncture strength when impregnated with an electrolyte and vibration resistance.

In the case of comparing separators for an electric double layer capacitor in which the weight ratio of fibrillated heat-resistant fibers to the total amount of polyester fibers and the weight ratio of fibrillated heat-resistant fibers to fibrillated cellulose are the same, but the finenesses of the polyester fibers are different, separators for an electric double layer capacitor 47 to 71 of Examples 47 to 71 containing polyester fibers “A” and “B” had superior capacitance retention rates in comparison with the separators for an electric double layer capacitor 1 to 18 of Examples 1 to 18 containing only polyester fibers “A”, the separators for an electric double layer capacitor 19 to 46 of Examples 19 to 46 containing polyester fibers “A” and “C”, and the separators for an electric double layer capacitor 72 to 96 of Examples 72 to 96 containing polyester fibers “A”, “B” and “C”. For example, in a comparison of Examples 1, 19, 47 and 72, in which the weight ratio of FB:(A+B+C) is 1:18 and the weight ratio of FB:FBC is 1:6 in common, Example 47 is the most superior in an evaluation of capacitance retention rate.

In the case of comparing separators for an electric double layer capacitor in which the weight ratio of fibrillated heat-resistant fibers to the total amount of polyester fibers and the weight ratio of fibrillated heat-resistant fibers to fibrillated cellulose are the same, but the finenesses of the polyester fibers are different, separators for an electric double layer capacitor 72 to 96 of Examples 72 to 96 containing polyester fibers “A”, “B” and “C” have fewer capacitance fluctuations, have superior reliability and are superior in terms of vibration resistance due to their high puncture strength when impregnated with an electrolyte in comparison with the separators for an electric double layer capacitor 1 to 18 of Examples 1 to 18 containing only polyester fibers “A”, the separators for an electric double layer capacitor 19 to 46 of Examples 19 to 46 containing polyester fibers “A” and “C”, and the separators for an electric double layer capacitor 47 to 71 of Examples 47 to 71 containing polyester fibers “A” and “B”. For example, in a comparison of Examples 1, 19, 47 and 72, in which the weight ratio of FB:(A+B+C) is 1:18 and the weight ratio of FB:FBC is 1:6 in common, Example 72 is the most superior in an evaluation of capacitance fluctuations. In addition, Example 72 demonstrated the second best puncture strength when impregnated with an electrolyte after Example 19.

INDUSTRIAL APPLICABILITY

According to the present invention, a separator for an electric double layer capacitor is obtained that is suitable for use as a separator of an electric double layer capacitor operating at high voltages of 3 V or more.

Application examples of the present invention may include not only separators for an electric double layer capacitor operating at high voltages of 3 V or more, but also separators for an electric double layer capacitor operating at low voltages of less than 3 V. Other preferable applications thereof may include separators for an electrolytic capacitor, separators for a lithium ion battery, and separators for a gel electrolyte cell.

The invention claimed is:

1. A separator for an electric double layer capacitor comprising: a porous sheet containing fibrillated heat-resistant fibers, polyester fibers having a fineness of 0.01 dtex to less than 0.10 dtex, and fibrillated cellulose.

2. The separator according to claim 1, wherein a weight ratio of the fibrillated heat-resistant fibers to the total amount of polyester fibers is 1:17 to 90:1, and a weight ratio of the fibrillated heat-resistant fibers to the fibrillated cellulose is 1:10 to 20:1.

3. The separator according to claim 1, wherein the fibrillated heat-resistant fibers have a softening point, a melting point and a thermal decomposition temperature all within a range of 250 to 700° C.

4. The separator according to claim 1, wherein the fibrillated heat-resistant fibers and the fibrillated cellulose have a Canadian standard freeness of 0 to 500 ml and a weight average fiber length of 0.1 to 2 mm.

5. The separator according to claim 1, wherein the fibrillated heat-resistant fibers are para-aramid fibers.

6. The separator according to claim 1, wherein the polyester fibers are polyethylene terephthalate fibers.

7. The separator according to claim 1, wherein the separator has a thickness of 10 to 80 μm and a density of 0.25 to 0.65 $g/cm^3$.

8. The separator according to claim 1, wherein the separator has a static friction coefficient of 0.40 to 0.65, measured in accordance with the inclined method of JIS P8147 using a 100 g weight consisting of a rectangular solid having a vertical and horizontal length of 25 mm and height of 20 mm.

9. The separator according to claim 1, wherein the separator has a puncture strength of 1.40 N or more when impregnated with an electrolyte.

10. A separator for an electric double layer capacitor comprising: a porous sheet containing fibrillated heat-resistant fibers, polyester fibers having a fineness of 0.01 dtex to less than 0.10 dtex, polyester fibers having a fineness of greater than 0.45 dtex to less than 1.00 dtex, and fibrillated cellulose.

11. The separator according to claim 10, wherein a weight ratio of the fibrillated heat-resistant fibers to the total amount of polyester fibers is 1:17 to 44:1, a weight ratio of the fibrillated heat-resistant fibers to the fibrillated cellulose is 1:10 to 20:1, and a weight ratio of the polyester fibers having a fineness of 0.01 dtex to less than 0.10 dtex to the polyester fibers having a fineness of greater than 0.45 dtex to less than 1.00 dtex is 1:50 to 79:1.

12. The separator according to claim 10, wherein the fibrillated heat-resistant fibers have a softening point, a melting point and a thermal decomposition temperature all within a range of 250 to 700° C.

13. The separator according to claim 10, wherein the fibrillated heat-resistant fibers and the fibrillated cellulose have a Canadian standard freeness of 0 to 500 ml and a weight average fiber length of 0.1 to 2 mm.

14. The separator according to claim 10, wherein the fibrillated heat-resistant fibers are para-aramid fibers.

15. The separator according to claim 10, wherein the polyester fibers are polyethylene terephthalate fibers.

16. The separator according to claim 10, wherein the separator has a thickness of 10 to 80 μm and a density of 0.25 to 0.65 $g/cm^3$.

17. The separator according to claim 10, wherein the separator has a static friction coefficient of 0.40 to 0.65, measured in accordance with the inclined method of JIS P8147 using a 100 g weight consisting of a rectangular solid having a vertical and horizontal length of 25 mm and height of 20 mm.

18. The separator according to claim 10, wherein the separator has a puncture strength of 1.40 N or more when impregnated with an electrolyte.

19. A separator for an electric double layer capacitor comprising: a porous sheet containing fibrillated heat-resistant fibers, polyester fibers having a fineness of 0.01 dtex to less than 0.10 dtex, polyester fibers having a fineness of 0.10 to 0.45 dtex, and fibrillated cellulose.

20. The separator according to claim 19, wherein a weight ratio of the fibrillated heat-resistant fibers to the total amount of polyester fibers is 1:17 to 44:1, a weight ratio of the fibrillated heat-resistant fibers to the fibrillated cellulose is 1:10 to 20:1, and a weight ratio of the polyester fibers having a fineness of 0.01 dtex to less than 0.10 dtex to the polyester fibers having a fineness of 0.10 to 0.45 dtex is 1:79 to 79:1.

21. The separator according to claim 19, wherein the fibrillated heat-resistant fibers have a softening point, a melting point and a thermal decomposition temperature all within a range of 250 to 700° C.

22. The separator according to claim 19, wherein the fibrillated heat-resistant fibers and the fibrillated cellulose have a Canadian standard freeness of 0 to 500 ml and a weight average fiber length of 0.1 to 2 mm.

23. The separator according to claim 19, wherein the fibrillated heat-resistant fibers are para-aramid fibers.

24. The separator according to claim 19, wherein the polyester fibers are polyethylene terephthalate fibers.

25. The separator according to claim 19, wherein the separator has a thickness of 10 to 80 μm and a density of 0.25 to 0.65 $g/cm^3$.

26. The separator according to claim 19, wherein the separator has a static friction coefficient of 0.40 to 0.65, measured in accordance with the inclined method of JIS P8147 using a 100 g weight consisting of a rectangular solid having a vertical and horizontal length of 25 mm and height of 20 mm.

27. The separator according to claim 19, wherein the separator has a puncture strength of 1.40 N or more when impregnated with an electrolyte.

28. A separator for an electric double layer capacitor comprising: a porous sheet containing fibrillated heat-resistant fibers, polyester fibers having a fineness of 0.01 dtex to less than 0.10 dtex, polyester fibers having a fineness of 0.10 to 0.45 dtex, polyester fibers having a fineness of greater than 0.45 dtex to less than 1.00 dtex, and fibrillated cellulose.

29. The separator according to claim 28, wherein a weight ratio of the fibrillated heat-resistant fibers to the total amount of polyester fibers is 1:17 to 44:1, a weight ratio of the fibrillated heat-resistant fibers to the fibrillated cellulose is 1:10 to 20:1, and a weight ratio of the total amount of the polyester fibers having a fineness of 0.01 dtex to less than 0.10 dtex and the polyester fibers having a fineness of greater than 0.45 dtex to less than 1.00 dtex to the polyester fibers having a fineness of 0.10 to 0.45 dtex is 1:40 to 79:1.

30. The separator according to claim 28, wherein the fibrillated heat-resistant fibers has a softening point, a melting point and a thermal decomposition temperature all within a range of 250 to 700° C.

31. The separator according to claim 28, wherein the fibrillated heat-resistant fibers and the fibrillated cellulose have a Canadian standard freeness of 0 to 500 ml and a weight average fiber length of 0.1 to 2 mm.

32. The separator according to claim 28, wherein the fibrillated heat-resistant fibers are para-aramid fibers.

33. The separator according to claim 28, wherein the polyester fibers are polyethylene terephthalate fibers.

34. The separator according to claim 28, wherein the separator has a thickness of 10 to 80 μm and a density of 0.25 to 0.65 $g/cm^3$.

35. The separator according to claim 28, wherein the separator has a static friction coefficient of 0.40 to 0.65, measured in accordance with the inclined method of JIS P8147 using a 100 g weight consisting of a rectangular solid having a vertical and horizontal length of 25 mm and height of 20 mm.

36. The separator according to claim 28, wherein the separator has a puncture strength of 1.40 N or more when impregnated with an electrolyte.

* * * * *